(12) United States Patent
Leegate et al.

(10) Patent No.: US 9,746,561 B2
(45) Date of Patent: Aug. 29, 2017

(54) MARKER SYSTEM

(71) Applicant: ARCACHON HOLDINGS LLC, Clearwater, FL (US)

(72) Inventors: Gary Leegate, Clearwater, FL (US); Marcia Baldwin, Clearwater, FL (US); Jamey Marcus Caldwell, Carthage, NC (US)

(73) Assignee: ARCACHON HOLDINGS LLC, Clearwater, FL (US)

( * ) Notice: Subject to any disclaimer, the term of this patent is extended or adjusted under 35 U.S.C. 154(b) by 0 days.

(21) Appl. No.: 15/278,913

(22) Filed: Sep. 28, 2016

(65) Prior Publication Data

US 2017/0016991 A1 Jan. 19, 2017

Related U.S. Application Data

(63) Continuation-in-part of application No. 15/130,121, filed on Apr. 15, 2016, now Pat. No. 9,476,982, which is a continuation-in-part of application No. 14/868,989, filed on Sep. 29, 2015, now Pat. No. 9,341,714, which is a continuation-in-part of application No. 14/715,676, filed on May 19, 2015, now Pat. No. 9,175,837, which is a continuation-in-part of application No. 14/515,918, filed on Oct. 16, 2014, now Pat. No. 9,144,261.

(51) Int. Cl.
| | |
|---|---|
| *F21V 21/08* | (2006.01) |
| *G01S 17/74* | (2006.01) |
| *F41G 3/14* | (2006.01) |
| *A42B 3/04* | (2006.01) |

(52) U.S. Cl.
CPC ............ *G01S 17/74* (2013.01); *A42B 3/0433* (2013.01); *A42B 3/0453* (2013.01); *F41G 3/145* (2013.01)

(58) Field of Classification Search
CPC ............. F21V 21/0816; F21V 33/0064; F21V 23/0492; F21V 33/0076
USPC .................................. 362/103–120
See application file for complete search history.

(56) References Cited

U.S. PATENT DOCUMENTS

| | | | |
|---|---|---|---|
| 4,195,328 A | 3/1980 | Harris, Jr. | |
| 5,414,405 A | 5/1995 | Hogg et al. | |
| 5,633,623 A | 5/1997 | Campman | |
| 6,213,623 B1 | 4/2001 | Campman | |

(Continued)

FOREIGN PATENT DOCUMENTS

WO WO2009101391 A2 8/2009

*Primary Examiner* — William Carter
(74) *Attorney, Agent, or Firm* — Larson & Larson, P.A.; Frank Liebenow

(57) ABSTRACT

A marker system includes at least one emitter. The emitter(s) emit light responsive to a flow of electrical current there through. The marker system includes a device for acquiring an incoming signal and a circuit for processing the incoming signal. The circuit for processing the incoming signal monitors the device for acquiring the incoming signal to determine if the incoming signal includes any of a plurality of incoming Identification Friend or Foe (IFF) and/or munitions-targeting signals. The circuit emits one of a plurality of responses by sending electrical current selectively through the emitter(s) and/or other feedback devices based upon which of the plurality of incoming Identification Friend or Foe (IFF) and/or munitions-targeting signals is detected by the means for processing.

11 Claims, 15 Drawing Sheets

(56) References Cited

U.S. PATENT DOCUMENTS

| | | |
|---|---|---|
| 7,021,790 B2 | 4/2006 | Parsons |
| 7,023,004 B2 | 4/2006 | Ford et al. |
| 7,505,279 B2 | 3/2009 | Ohtaki et al. |
| 7,722,205 B2 | 5/2010 | Kim |
| 7,831,150 B2 * | 11/2010 | Roes .................... F41G 3/2655 342/45 |
| 8,477,492 B2 | 7/2013 | Rothkopf et al. |
| 8,485,686 B2 | 7/2013 | Swan et al. |
| 8,534,861 B2 | 9/2013 | Leegate et al. |
| 8,573,797 B2 | 11/2013 | Spartano et al. |
| 8,672,504 B2 | 3/2014 | Kramer |
| 2008/0216699 A1 | 9/2008 | McAleer et al. |
| 2010/0128468 A1 | 5/2010 | Ong et al. |

* cited by examiner

MARKER SYSTEM

CROSS-REFERENCE TO RELATED APPLICATION

This application is a continuation in part of U.S. patent application Ser. No. 15/130,121 filed Apr. 15, 2016, which in turn is a continuation in part of U.S. patent application Ser. No. 14/868,989 issued as U.S. Pat. No. 9,341,714 on May 17, 2016, which in turn is a continuation in part of U.S. patent application Ser. No. 14/715,676, issued as U.S. Pat. No. 9,175,837 on Nov. 3, 2015, which in turn is a continuation in part of U.S. patent application Ser. No. 14/515,918, issued as U.S. Pat. No. 9,144,261 on Sep. 29, 2015, the disclosure of all the above are hereby incorporated by reference.

FIELD

This invention relates to the field of marker systems, and more particularly to a personnel/combatant identification/marker light optionally having "Identification Friend or Foe" (IFF) interrogation and/or munitions-targeting acquisition and response capabilities.

BACKGROUND

Currently there are several marking/indicator devices that emit various wavelengths of light as needed. In many scenarios, specific situations require personnel/combatants to wear, carry, or mount multiple marking devices to their helmets, clothing, equipment, etc., to meet operational needs. For instance and in the past, military free fall parachuting performed at night often required the combatant carry a chemical light or single-use, single spectrum electronic equivalent for collision-avoidance while in free fall. Additionally, the combatant had to carry a white strobe light to meet FAA requirements for parachuting at night during training. Also, the combatant had to wear a multi-function visible and/or infrared helmet-mounted light to identify and mark personnel for command and control purposes once on the ground. Finally, for certain operations, the combatant had to wear or carry an IFF interrogation response device to signal back when interrogated or illuminated by friendly forces using handheld, weapon-mounted, aircraft, or vehicle-mounted infrared laser devices.

Multiple devices create a plethora of issues such as maintaining each device (e.g. fresh batteries for each operation, testing functionality before operations, etc.), and controlling the function of each device at various stages of the operation (e.g., changing from overt to covert operation, etc.). Further, the total weight of such devices and their respective battery packs as well real estate for each device (e.g., helmet space) is often an issue.

Single-purpose IFF interrogation response devices, including those integrated into patches that are attached by hook and loop material to the arm or shoulder exist, but the range of such, the directionality of such, and feedback flexibility from such are limited due to physical characteristics of such, limited acquisition and emission angles, and installation location constraints on the combatant.

In some scenarios, aircraft or ground-based vehicles illuminate a target or target area with a specific wavelength of laser radiation, often modulated with a secure code of the day, before using the reflections of such illumination to launch laser-guided munitions; in such cases it is important that forward-deployed combatants such as forward observers be alerted that they are being illuminated by such targeting lasers so as to initiate self-protection procedures including radio communication with the targeting aircraft or vehicle.

What is needed is a single device that will provide a one or several marking capabilities as well as optionally responding to proper IFF interrogation or illumination by a targeting laser.

SUMMARY

In one embodiment, a marker system is disclosed including at least one emitter. The emitter(s) emit light responsive to a flow of electrical current there through. The marker system includes a device for acquiring an incoming signal and a circuit for processing the incoming signal. The circuit for processing the incoming signal monitors the device for acquiring the incoming signal to determine if the incoming signal includes any of a plurality of incoming Identification Friend or Foe (IFF) and/or munitions targeting signals. The circuit emits one of a plurality of responses by sending electrical current through the emitter(s) based upon which of the plurality of incoming Identification Friend or Foe (IFF) interrogation and/or munitions targeting signals (hereinafter "IFF interrogation/targeting signals") is detected by the means for processing.

In another embodiment, a marker system is disclosed including several emitters electrically interfaced to a controller such that, upon the controller initiating a flow of electric current though one or more of the emitters, the one or more of the emitters emit light. At least one detector is also electrically interfaced to the controller. The detector(s) detect light in of a specific wavelength and convert the light to an electrical signal that is received and understood by the controller. Software that is stored on a non-transitory storage associated with the controller monitors the at least one detector for any of a plurality of incoming IFF interrogation/targeting signals. Responsive to receiving and detecting any one of the plurality of incoming IFF interrogation/targeting signals from the at least one detector, the software initiates the flow of electric current through a selected set of the plurality of emitters.

In another embodiment, a marker system is disclosed including a vibration device, a switch, at least one light emitting diode, and at least one photo detector electrically interfaced to a controller. Software stored on a non-transitory storage associated with the controller determines a mode based upon signals from the switch. Upon the software detecting one of a plurality of incoming IFF interrogation/targeting signals from any of the at least one photo detectors, the software provides electrical current to a subset of the at least one light emitting diode to respond to the one of the incoming IFF interrogation/targeting signals, thereby the subset of the at least one light emitting diode emits light responsive to the software detecting the one of the incoming IFF interrogation/targeting signals.

In another embodiment, a marker system is disclosed including at least one emitter. Each of the at least one emitter emits the first light responsive to a flow of electrical current through that emitter. There is a device for acquiring an incoming signal and a circuit for processing the incoming signal. The circuit for processing the incoming signal monitors the device for acquiring the incoming signal to determine if the incoming signal includes an incoming IFF interrogation/targeting signal. The circuit emits a response when the circuit for processing detects the incoming IFF interrogation/targeting signal from the device for acquiring.

In another embodiment, a marker system is disclosed including a controller with a plurality of emitters electrically interfaced to the controller such that, upon the controller initiating a flow of electric current though one or more of the emitters, the one or more of the emitters emit light. There is also at least one detector electrically interfaced to the controller. The detector(s) are for detecting light in of a specific wavelength and converting the light to an electrical signal that is then received by the controller. Software is stored on a non-transitory storage associated with the controller. The software monitors the at least one detector for an incoming IFF interrogation/targeting signal and the software initiating the flow of electric current through a selected set of the plurality of emitters responsive to receiving the incoming IFF interrogation/targeting signal from the at least one detector.

In another embodiment, a marker system is disclosed including a controller having a first switch and a second switch electrically interfaced to the controller. The first switch for selectively chooses an operating function (e.g., specific emission wavelength, intensity, flashing rate) and the second switch for selectively chooses an operating mode (e.g., overt/visible, covert/infrared). At least one light emitting diode and at least one photo detector is/are electrically interfaced to the controller. An operating status configuration switch is also electrically interfaced to the controller. The operating status configuration switch is for determining the status of the marker system (by the user/wearer). A vibration device is electrically interfaced to the controller. Software is stored on a non-transitory storage associated with the controller. The software determines a mode based upon signals from the first switch and the second switch and, based upon the mode, the circuit selectively provides electrical current to one or more of the at least one light emitting diode such that the one or more of the at least one light emitting diode emit light. Upon the software detecting an incoming IFF interrogation/targeting signal from any of the at least one photo detectors, the controller provides electrical current to a subset of the at least one light emitting diode in response to the incoming IFF interrogation/targeting signal, thereby the subset of the at least one light emitting diode emits light responsive to the software detecting the incoming IFF interrogation/targeting signal.

The current invention has several separate and distinct user-specified functions which are combinations of (a) emission in one or more wavelengths, (b) intensity variation—from off to very low brightness to strobe-level brightness, and (c) operation at differing flash rates, steady, or coded. The marking system combines the function and utility of multiple single-purpose functions into a single, marker device that is, for example, programmable to provide four user-defined identification/marker functions within two operating modes with optional user-defined IFF interrogation/targeting response functions. The marker system has multi-directional signal emission and acquisition operating profile. Such visual and infrared identification/marking capabilities combined with IFF interrogation/targeting signal response functions are intended to both save lives in close combat as well as provide an important anti-fratricide feature for long-range sniper operations at night.

The marker system combines visible and/or covert personnel identification and marking functions and IFF interrogation/targeting signal response features into a single device for mounting to or integrating upon, for example, a military helmet.

In some embodiments, the marker system provides a photo sensor array coupled to a processing system to acquire and process incoming infrared laser signals from any line-of-sight direction. Upon detection of an interrogation or targeting signal, the marker system emits a response to the source of that incoming signal (the interrogator) that indicates to the interrogator that the person wearing the marker system is a "friendly" person/combatant. The response is a clear, unambiguous signal to the interrogator not to engage (fire on) the person/combatant.

In some embodiments, the marker system provides an alert to the user/wearer, with tactile, visual and/or aural signals, after the marker system receives an incoming IFF interrogation/targeting signal (e.g., a preprogrammed or expected interrogation). In some embodiments, such feedback is provided by a device or emitter (e.g., vibratory motor, visible emitter, light-guide termination, sound generator) that is connected to the marker system via an electrical, fiber-optic, or other type of cable.

In some embodiments, the marker system provides operating status confirmation (OSC) feedback for the user/wearer to confirm, on demand, whether the device is in an INACTIVE state (wherein the device is not emitting in any spectrum and/or is not receptive or responsive to an IFF interrogation), in an ON state (wherein the device is emitting an identification/marker and/or is receptive and responsive to an IFF interrogation) and/or in a STANDBY state (wherein the device is not emitting any identification/marker spectrum, but is receptive and responsive to an IFF interrogation).

In some embodiments, the marker system provides the operating status confirmation (OSC) feedback by activation via a switching that is disposed upon the marker system, and that the feedback is provided through the operating status confirmation (OSC) feedback (e.g., vibratory motor, visible emitter, light-guide termination, sound generator), such feedback may be integral to the device itself and/or provided remote from the device, wired or wirelessly connected to feedback means inside the helmet or visible on the front inner edge of the helmet or in a heads-up display mounted to the helmet.

In some embodiments, the marker system is provided in a housing comprising controls there on and in some embodiments the housing has a minimally obstructive shape on all sides and edges for mounting on helmets, other equipment, or structures, reducing snag potential or interference with objects that may be encountered during ground combat operations or parachuting, including interference with parachute lines and risers.

In some embodiments, the marker system is provided with a non-planar base, the bottom surface of the base has an arcuate concavity to fit the contour of the external shell of a military helmet, for example using an interfacing material such a hook and loop material or self-adhesives.

In some embodiments, the marker system provides a selector to select between two distinct and independent operating modes (e.g., visible/overt and infrared/covert) with one or more discreet visible and/or infrared emission function profiles in each operating mode. In some such embodiments, these independent function sets are separated and segregated by one or more separate switches disposed upon the housing and/or the base.

In some embodiments, the marker system provides a plurality of emitters to allow a user-defined selection of different operating functions in the visible and/or infrared spectrum.

In some embodiments, the marker system provides the variety and combination of user-defined functions described on a standard, common hardware platform that is changeable through software/firmware programming.

In some embodiments, the marker system provides a housing through which emitted light radiates in an omni-directional fashion providing line-of-sight visual access over a full hemisphere relative to the device ground plane when mounted/installed.

In some embodiments, the marker system is configured to facilitate secure, conformal mounting to standard attachment devices built onto the helmet structure (e.g., Picatinny rails), or other worn equipment (e.g., tactical vests, web gear, armor plate carriers).

In some embodiments, the marker system includes at least one emitter that emits light responsive to a flow of electrical current through the emitter(s). There is a set of devices for acquiring incoming signals that also provide directional data (e.g., an indication of the direction of the incoming signal). There is a processing element for processing the incoming signals. The processing element monitors the devices for acquiring the incoming signals and determines if the incoming signals includes any of a plurality of incoming Identification Friend or Foe (IFF) and munitions-targeting signals. There is also a device for notifying a user of the marker system (e.g. illumination or vibration). Upon detecting an incoming Identification Friend or Foe (IFF), the processing element notifies the user by way of the device for notifying; the notification includes a direction from which the Identification Friend or Foe (IFF) came. Upon detecting an incoming munitions-targeting signal, the processing element notifies the user by way of the device for notifying; the notification includes a direction from which the munitions-targeting signals came.

In some embodiments, a marker system includes a controller having a plurality of emitters electrically interfaced thereto such that, upon the controller initiating a flow of electric current though one or more of the emitters, the one or more of the emitters emit light. There is a device for notifying a user of the marker system and at least two detectors electrically interfaced to the controller. The at least two detectors detect light in of a specific wavelength and convert the light into an electrical signal that is received by the controller. The at least two detectors RE oriented within the marker system to provide a directional indication of the detecting the light. Software associated with the controller monitors the detectors and upon detecting an incoming Identification Friend or Foe (IFF), the software notifies the user using the device for notifying. Upon detecting an incoming munitions-targeting signal by the software, the software notifies the user using the device for notifying.

In some embodiments, the marker system includes a controller, a switch electrically interfaced to the controller, a plurality of light emitting diodes, at least two photo detectors electrically interfaced to the controller, and a vibration device electrically interfaced to the controller. Each of the light emitting diodes emits light when provided electrical current under control of the controller. The at least two photo detectors are positioned within the marker system to provide directional data. Software stored associated with the controller invokes the controller to provide electrical current to one or more of the light emitting diodes such that the one or more of the light emitting diodes emit light, either steady or blinking based upon the position of the switch. Upon the software detecting an incoming Identification Friend or Foe (IFF) signal received by any of the at least two photo detector, if the switch is set to a non-stealth mode, the software provides electrical current in a first pattern to a first subset of the light emitting diodes to respond to the incoming Identification Friend or Foe (IFF). Upon the software detecting an incoming munitions-targeting signal received by any of the at least one photo detector, if the switch is in a non-stealth mode, the software provides electrical current in a second pattern to a second subset of the light emitting diodes to respond to the incoming munitions-targeting signal.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
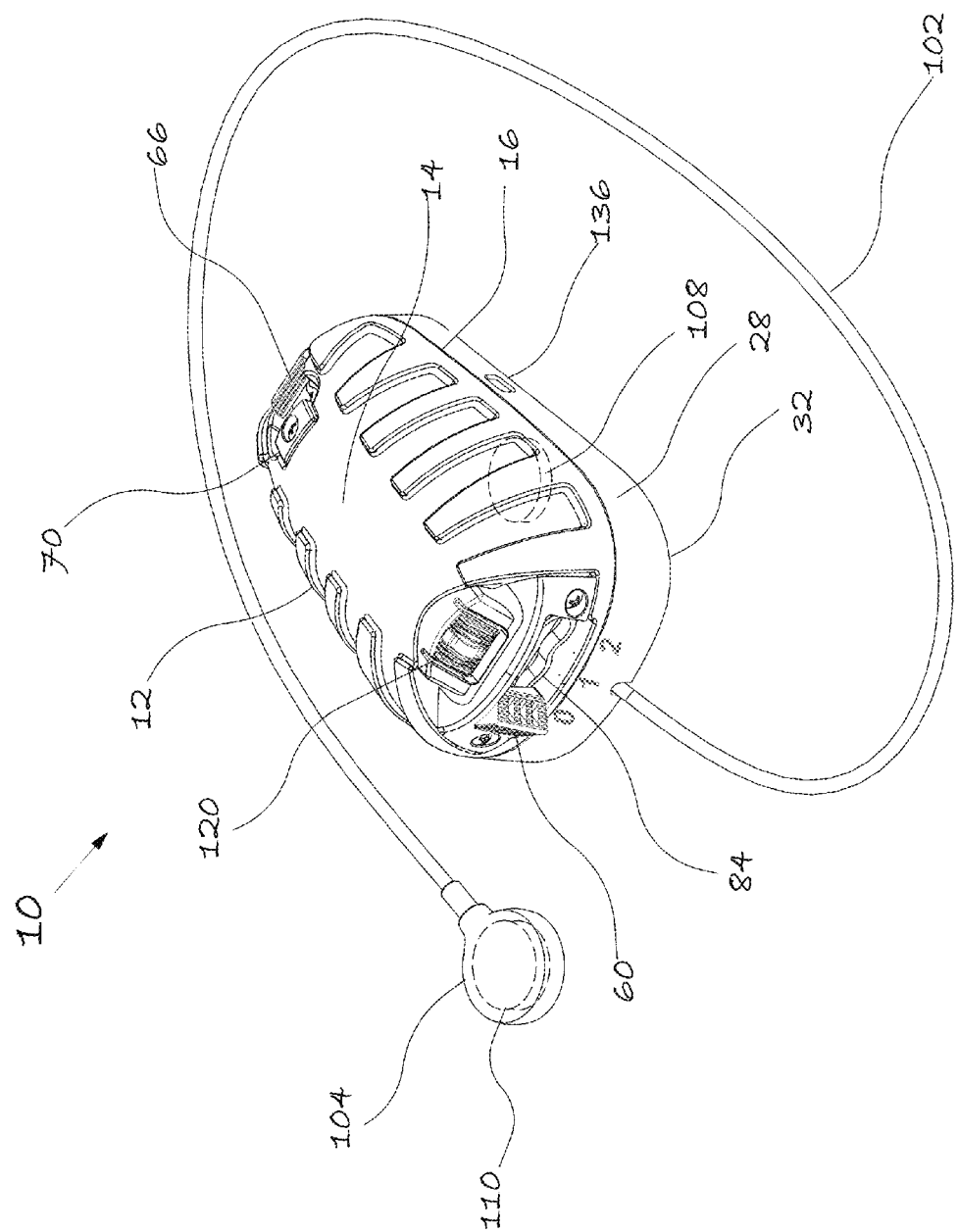
FIG. 1 illustrates a rear oblique view of the marker system.

Reference will now be made in detail to the presently preferred embodiments of the invention, examples of which are illustrated in the accompanying drawings. Throughout the following detailed description, the same reference numerals refer to the same elements in all figures.

Referring to FIGS. 1-4, views of the marker system 10 are shown. The marker system 10 includes a housing 12 that encloses and protects electronic components there within. Although many different housings 12 are anticipated, the housing 12 shown as an example includes a snag-resistant, generally convex upper area 14 that, at least part of the upper area 14 permits the passage of light out of and into the housing 12. In some embodiments, the housing 12 is convex and inwardly sloping to reduce snag hazards, as one of the intended uses of the marker system 10 is for parachuting and there is a need to prevent parachute lines and risers from snagging on the marker system 10. In this embodiment, the upper area 14 of the housing 14 connects to a base 28 (or lower portion 28) of the housing at a sealing surface 16. Also, in a preferred embodiment, the lower surface 32 of the base 28 is generally concave so as to conform to the contour of military headgear such as a military or parachuting helmet, though in some embodiments, the lower surface 32 is generally planar to conform and mount on other surfaces. In some embodiments, the lower surface 32 of the housing 12 removably attaches to a surface with a material such as hook and loop material.

In some embodiments, the base 28 includes an opening 136 that extends through the lower portion 28 and exits the lower surface 32 at a hole 132. This opening 132/136 allows for attaching a security cord to the marker system 10 to prevent loss should the material holding the marker system 10 fail (e.g., the hook and loop material is disengaged by coming in contact with another object or structure).

In embodiments in which the housing 12 separates from the base 28, there is a way to reduce the potential of water and/or moisture intrusion such as a seal 38 between the housing 12 and base 28, and there is a mechanism to attach the housing 12 and base 28 in order to maintain this sealing, such as a set of screws 26 passing through holes or bosses 22 in the base and setting in bosses in the upper part 14 of the housing 12, or alternate attachment means such as ultrasonic welding.

Switches 60/66/120 are disposed upon the housing 12 and/or the base 12. A mode switch 66 provides for the selection of one or more operating modes (e.g., visible/overt and infrared/covert). A function switch 60 provides for the selection of two or more operating functions (e.g., various emission spectra, intensity, flashing or steady operation) within each of the one or more operating modes (e.g., visible/overt, infrared/covert). When the operating status confirmation (OSC) switch 120 is activated, the operating status confirmation (OSC) switch 120 provides the user/wearer confirmation that the device is either INACTIVE, ON or in a STANDBY state. In the embodiment shown, the mode switch 66 is disposed upon the front of the housing, the function switch 60 is mounted on the back of the housing, and the operating status confirmation (OSC) switch 120 is integrated into the function switch retainer 64. There is no limitation on arrangement, placement, mounting, or style of the switches 60/66/120. Additionally, in some embodiments, the number and type of switches varies as for some applications, there are more or less switches with the same or different functionality.

Although there are many know switching arrangements, the example shown provides for a switching arrangement that reduces the possibility of water intrusion using magnets and reed switches communicating through waterproof barriers without the need for electrical wire interfaces passing through watertight enclosures. The function switch 60 includes a magnet 62 and a function switch retainer 64 held by a screw 26. As the function switch 60 is moved between positions as defined by split capture rings 84 within the function switch retainer 64, the magnet 62 moves into proximity with a corresponding reed switch (not shown) on a circuit board 54. The reed switches interface to a control circuit 200 (see FIGS. 8, 8A, and 9). The magnetic field passes from outside the housing, through the material of the housing and closes the reed switch on the interior of the housing that the magnet 62 is in proximity of, without compromising the waterproofness of the housing with wires passing from inside to outside the housing. Likewise, the mode switch 66 includes a magnet 68 imbedded within the mode switch 66 and held in place by, for example, a mode switch retainer 70 that is held to the housing 12 by screws 26. The mode switch retainer 70 retains the mode switch 66 allowing it to slide or otherwise move the embedded magnet 68 from one position to another. Another reed switch (not shown) is in proximity to one of the cavities supported by a circuit board 52 and this reed switch is interfaces to the control circuit 200 (see FIGS. 8, 8A, and 9), such that the circuit is able to determine the position of the mode switch 66 and magnet 68. The intent of such a mode switch 66 is to enable easy tactile identification of the position of the mode switch 66 in low-light conditions. The mode switch 66 is configured and/or shielded in such as way prevent inadvertent snagging and or movement from covert (infrared) into the overt (visible) emission mode in dark of night conditions, and thus make the user/wearer visible to enemy combatants. In the embodiments shown, the operating status confirmation (OSC) switch 120 includes a micro switch 121 that is interfaces to the control circuit 200 (see FIGS. 8, 8A, and 9). Again, there are no limitations as to the number, type, configuration, size, and/or location of the various switches 60/66/120.

Various emitters 58a/58b/58c are positioned, preferably, within the enclosure 12, shown for example connected to a circuit board 52. The emitters 58a/58b/58c are, for example, light emitting diodes (LEDs) 58a/58b/58c emitting any or all of a variety of wavelengths and intensities under control of the control circuit 200 (see FIGS. 8, 8A, and 9). By providing proper electrical flow through the emitters 58a/58b/58c, the control circuit 200 causes the emitters to emit the desired light as determined by the programming of the control circuit 200 and the settings of the switches 60/66/120. For example, a first set of emitters 58a are multi-chip light-emitting-diodes (LEDs) configured to emit red, green, and blue light individually or in combination based upon which internal chip(s) are provided with power, thereby providing a range of visible colors. Another emitter 58b, for example, is a high-intensity white emitter (LED). Yet another emitter 58c, for example, is/are infrared (IR) emitters, emitting light that is not generally visible to the naked eye of a human, in one or more wavelengths of infrared light. As will be shown, the controller 200 energizes one, multiple, or all emitters 58a/58b/58c as determined by setting of the switches 60/66/120 and stored programming to eliminate at a desired brightness, wavelength, and continuously or blinking/flashing.

In embodiments in which the marker system supports "Identification Friend or Foe" (IFF) interrogation and/or targeting laser acquisition and response capabilities, one or more detectors 92 are provided, electrically interfaced to the control circuit 200 (see FIGS. 8, 8A, and 9), for example, by the circuit board 52. The detectors 92, typically photo diodes, receive light from outside the housing 12. As will be explained, the detectors 92 receive light of a particular wavelength that is typically encoded with a secure code representing an IFF interrogation or munitions targeting signal.

In some embodiments, the detectors 92 respond to a certain spectrum of light such as the full infrared spectrum. In such, the marker system 10 detects any pre-determined IFF interrogation or munitions targeting signal on any light frequency of which the detectors 92 operate. In some embodiments, the detectors 92 provide both an signal level for detection of the pattern received (e.g. the IFF interrogation or munitions targeting signal encoding), as well as an indication of the spectrum of light on which the IFF interrogation or munitions targeting signal is received. For example, the detectors 92 provide an indication of either near infrared, short-wavelength infrared, mid-wavelength infrared or long-wavelength infrared, etc. By having such information, the marker system 10 is programmable to respond to one or more specific spectrums and one or more specific encodings of IFF interrogation or munitions targeting signal on each spectrum and/or provides notification of which wave-length is received. For example, the marker system 10 is programmed to only respond to an IFF interrogation on near infrared and to a munitions targeting signal on short-wavelength infrared. In such, security is improved as the enemy will not know which wavelength is carrying which type of signal, etc. In some such embodiments, the "Identification Friend or Foe" (IFF) interrogation and/or targeting laser acquisition is received over multiple wavelengths. For example, parts of the "Identification Friend or Foe" (IFF) interrogation and/or targeting laser acquisition are received on two separate wavelengths, either simultaneously or alternating between the wavelengths.

Figure 4:
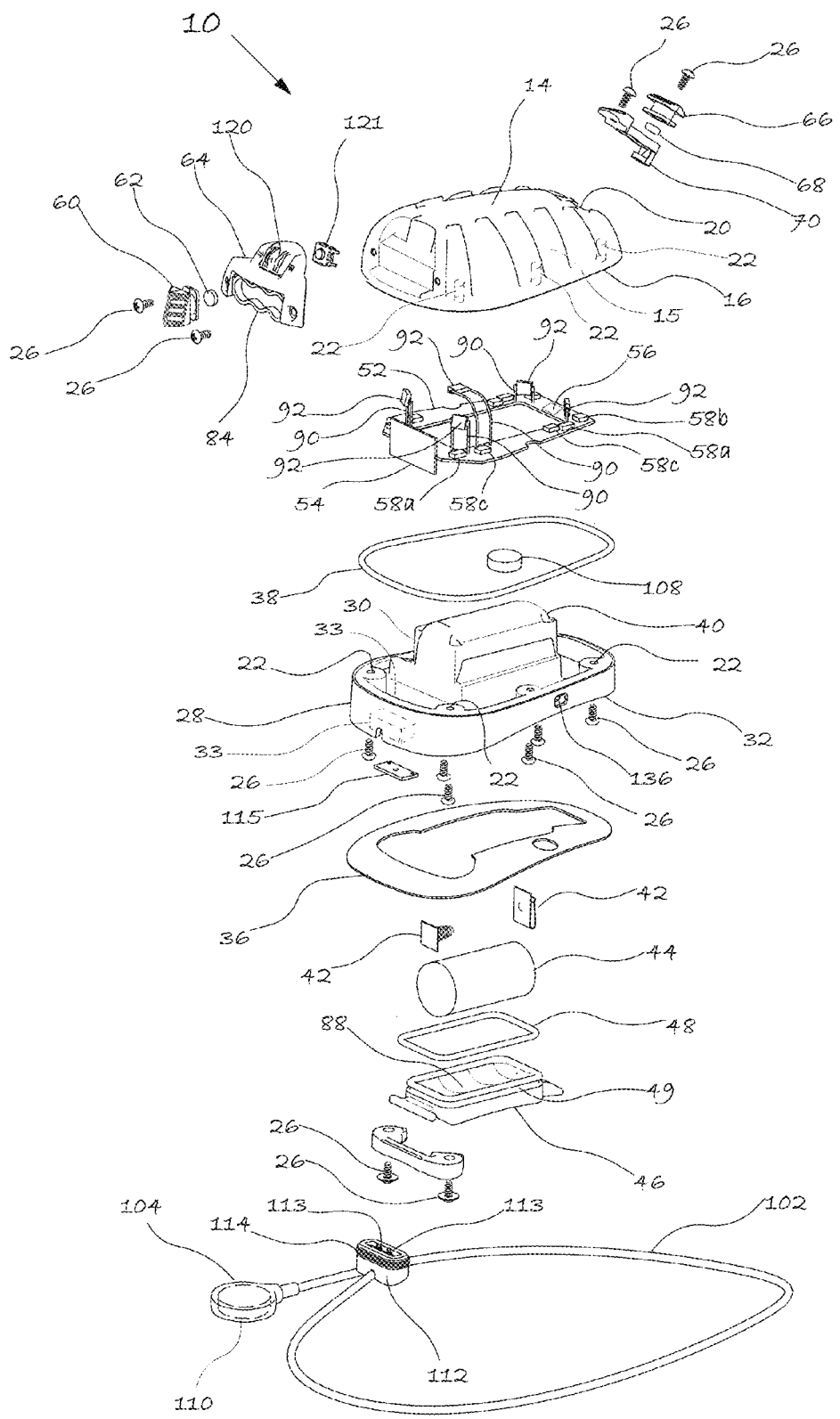
FIG. 4 illustrates an exploded view of the marker system.

In some embodiments, the detectors 92 are positioned directionally to determine a direction of the source of the transmission of the "Identification Friend or Foe" (IFF) interrogation and/or targeting laser acquisition. As for example, the arrangement of the detectors 92 in FIG. 4 provides for determination of direction in four general quadrants as the detectors 92 are aimed at 45 degrees, 135 degrees, 235 degrees, and 315 degrees (assuming 0 degrees is directly in front of the marker system 10). In such, if one detector 92 receives a stronger signal than the other detectors 92, it is determined that the signal emanates from the respective direction. Additionally, a detector 92 aimed upwards as shown in FIG. 4 also provides for determining when the source of the transmission of the "Identification Friend or Foe" (IFF) interrogation and/or targeting laser acquisition is above the marker system 10 (e.g. aerial or from a building, etc.). Although shown as five detectors 92 mounted at 45 degrees, 135 degrees, 225 degrees, 315 degrees, and above, any number of detectors 92 mounted in any configuration is anticipated. For example, two detectors 92 mounted at 90 degrees and 270 degrees for determining if the source of the transmission of the "Identification Friend or Foe" (IFF) interrogation and/or targeting laser acquisition is to the right or to the left of the marker system 10.

In the case of IFF interrogation (e.g., light of a particular wavelength that is typically encoded with a secure code), the light is transmitted from a remote device aimed by a first combatant at a second combatant wearing the marker system 10. The first combatant is trained to expect a known response from friendly combatants such as a predetermined flashing of one or more of the emitters 58a/58b/58c, for example, a predetermined number of flashes of an infrared emitter 58c, on for a predetermined period and off for a predetermined period. In this way, a first combatant (e.g., a sniper) uses a device to transmit the interrogation to the maker system 10 worn by a second combatant and the marker system, recognizing the secure code, properly responds to the interrogation, communicating to the first combatant (e.g., sniper) that the second combatant is friendly. Otherwise, the first combatant (e.g., sniper), in absence of the proper response, will assume the second combatant is not friendly (e.g., a foe) and take appropriate action and/or engagement.

In the case of a munitions targeting signal (e.g., light of a particular wavelength that is typically encoded with a secure code) is transmitted by a first combatant operating either a handheld, aircraft-installed, or vehicle-installed munitions targeting device, and such signal impinges upon the marker system 10 worn by the second combatant. In this case, the first combatant was not likely aware that the second combatant was in the first combatant's target zone. Upon acquisition and processing of the incoming targeting signal by the marker system 10 worn by the second combatant, the marker system 10 emits, for example, a predetermined flashing of one or more of the emitters 58a/58b/58c, for example, a predetermined number of flashes of an infrared emitter 58c, on for a predetermined period and off for a predetermined period, thus alerting the first combatant that the second, friendly combatant in the target zone and can abort launch of the targeting signal-guided munitions. Otherwise, the first combatant operating the munitions targeting device in absence of a response, assumes the target area is free of friendly combatants and proceeds with the launch of targeting signal-guided munitions.

Figure 2:
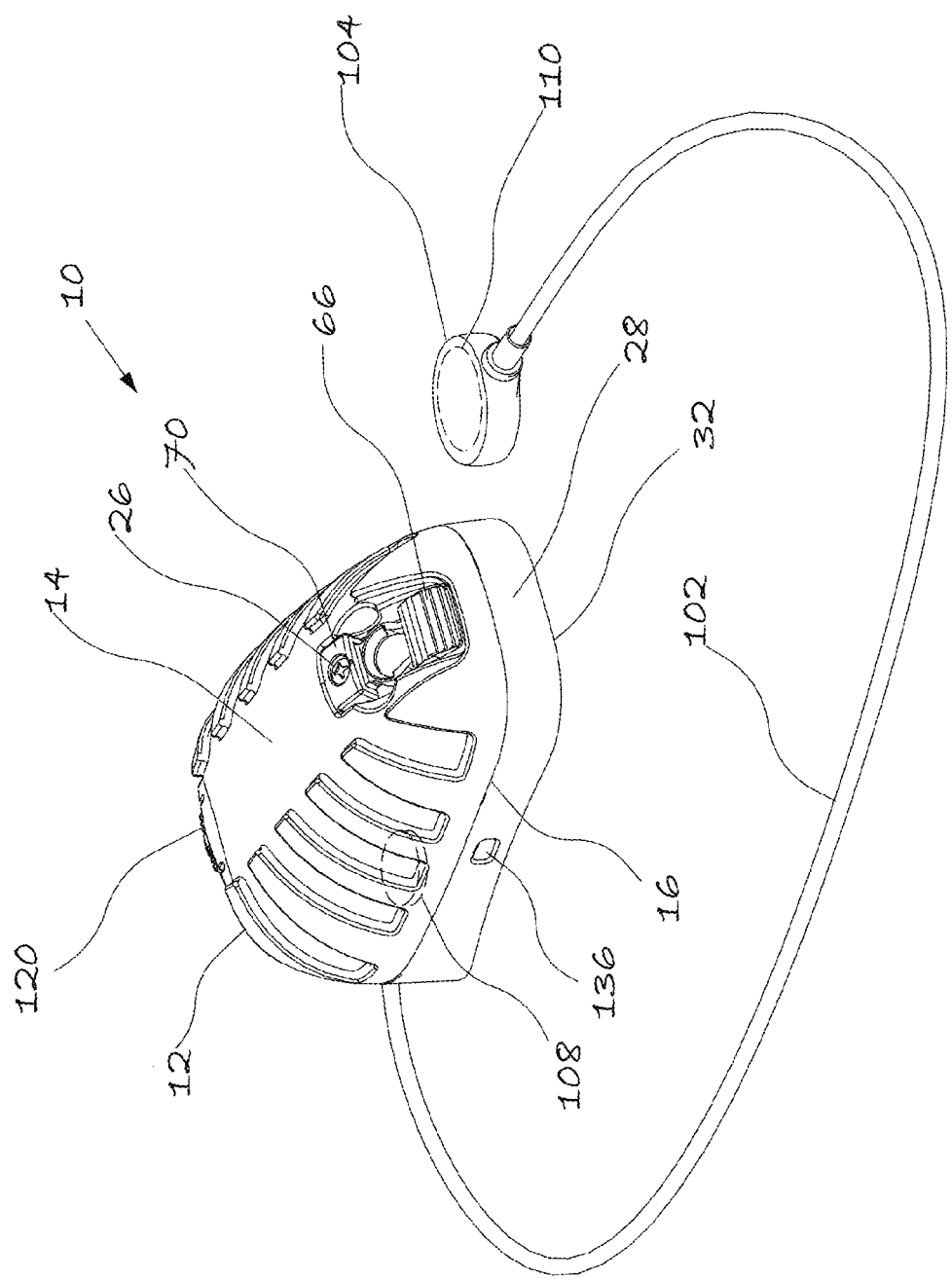
FIG. 2 illustrates a front oblique view of the marker system.
Figure 3:
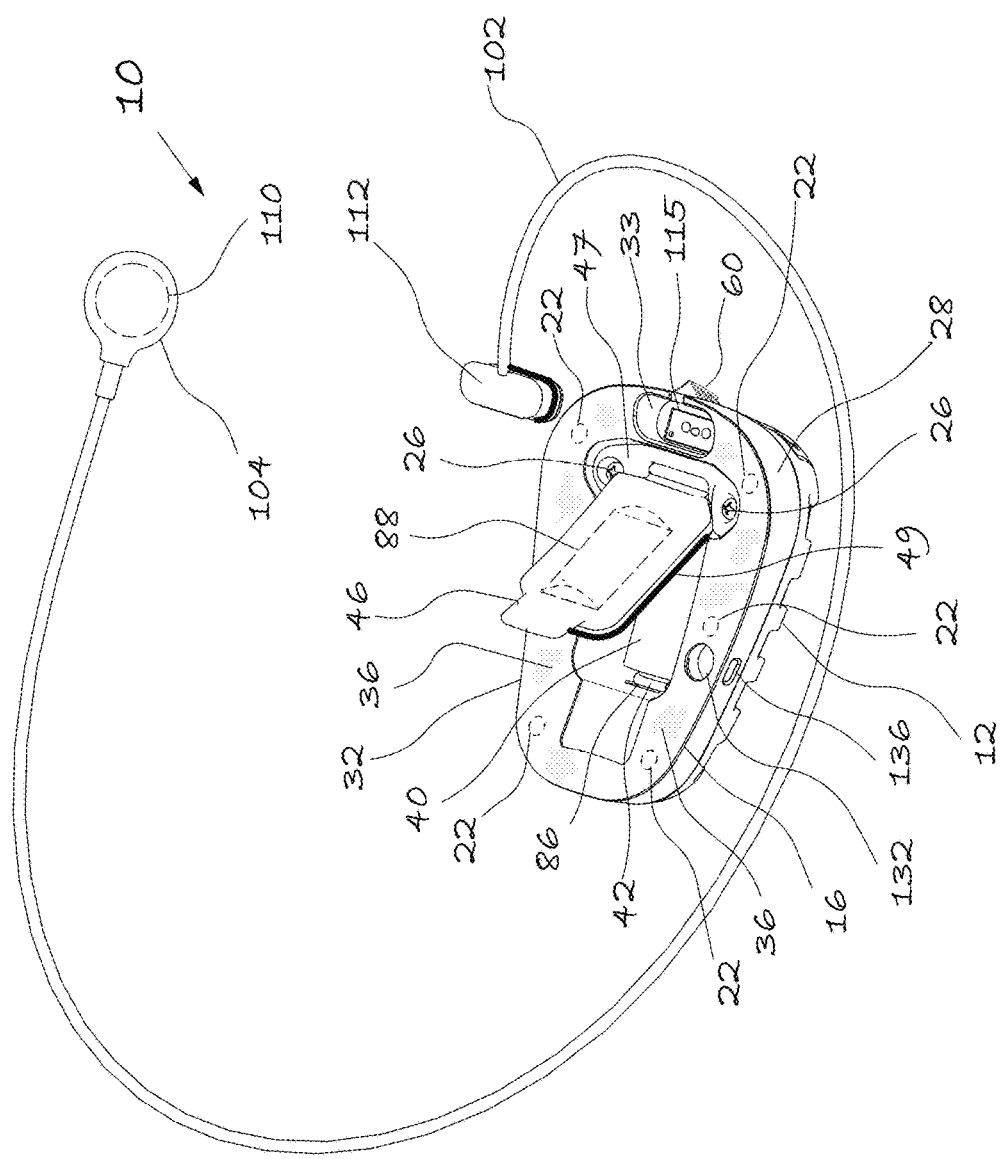
FIG. 3 illustrates a bottom oblique view of the marker system with the user feedback device shown disconnected.

In some embodiments, there is a mechanism for notifying the user of the marker system 10 that an IFF interrogation or munitions targeting signal was received and recognized. In the embodiments of FIGS. 1-4, an external vibratory pad 104 is provided, connected to the marker system 10 by a cable 102 (e.g. one or more grouped wires or fiber optics). In the example of FIGS. 1 and 2, one end of the cable 102 is connected to a vibration device 110 within the vibratory pad 104 and the other end of the cable 102 passes into the housing 12 and is connected to the control circuit 200 (see FIGS. 8, 8A, and 9). In the example of FIGS. 3 and 4, one end of the cable 102 is connected to a vibration device 110 within the vibratory pad 104 and the other end of the cable terminates in a connector 112 that plugs into a mating connector 33 of the housing 12, electrically interfacing to the control circuit 200 (see FIGS. 8, 8A, and 9) through, for example, contacts 113 of the connector 112 making electrical contact with mating contacts 115 of the mating connector 33. Note that in some embodiments, the connector 112 has a seal 114 to prevent moisture from penetrating and getting into the area of the contacts 113/115 when connected. Although any vibration device 110 is anticipated, in some embodiments, the vibration device 110 comprises a motor having an offset mass on the shaft of the motor such that, when the motor is energized by the control circuit 200, the offset mass creates vibration.

In some embodiments, an internal vibration generating device 108 is present within the enclosure defined by the housing 14 and the base 28, under control of the controller 200.

In some embodiments, the mechanism for notifying the user of the marker system 10 is a helmet-mounted heads-up display 59 that provides visual indication of reception of an IFF interrogation or munitions targeting signal was received and recognized.

In embodiments with directionally capability (e.g. having directionally orientated detectors 92), the notification includes an indication of direction of the source of the transmission of the "Identification Friend or Foe" (IFF) interrogation and/or targeting laser acquisition. In some embodiments, the vibration pattern is varied based upon the direction from which the source of the transmission of the "Identification Friend or Foe" (IFF) interrogation and/or targeting laser acquisition is coming from. For example, a long vibration followed by a number of short vibrations indicating direction (one short vibration for 45 degrees, two short vibrations for 135 degrees, three short vibrations for 225 degrees and four short vibrations for 315 degrees). In this example, an additional long vibration indicates the source of the transmission of the "Identification Friend or Foe" (IFF) interrogation and/or targeting laser acquisition is above the marker system 10.

In some embodiments, a helmet-mounted heads-up display provides visual indication of reception the "Identification Friend or Foe" (IFF) interrogation and/or targeting laser acquisition. In such embodiments, upon reception of the "Identification Friend or Foe" (IFF) interrogation and/or targeting laser acquisition, an emitter 59 (see FIG. 8A) provides visual indication of reception the "Identification Friend or Foe" (IFF) interrogation and/or targeting laser acquisition. In embodiments with directional detection, the emitter 59 has multiple LEDs for the indication of direction. For example, two LEDs having masking in the form of left and right arrows provide indication of the source being to the left or the right, respectively. As another example, the emitter is a single LED having multiple color outputs (e.g. an Red/Blue/Green LED for additive color production) and the color from /the emitter is used to convey the direction of the source of the "Identification Friend or Foe" (IFF) interrogation and/or targeting laser acquisition. For example, red for 45 degrees, yellow for 135 degrees, green for 225 degrees and violet for 315 degrees and blinking for reception from above.

In some embodiments in which detectors 92 have features to determine and provide indication of the wavelength on which the "Identification Friend or Foe" (IFF) interrogation and/or targeting laser acquisition is received; the notification indicates which wavelength was received. In some such embodiments, the vibration pattern is varied based upon the wavelength of the "Identification Friend or Foe" (IFF) interrogation and/or targeting laser acquisition is coming from. For example, a long vibration followed by a number of short vibrations indicating the wave-length (one short vibration for near infrared, two short vibrations for short-wavelength infrared, three vibrations for mid-wavelength infrared, or four vibrations for long-wavelength infrared).

In some embodiments, the response to "Identification Friend or Foe" (IFF) interrogation and/or targeting laser acquisition is made with emitters emitting the same wavelength of light than the received wavelength of light. For example, if the "Identification Friend or Foe" (IFF) interrogation and/or targeting laser acquisition is received in the near-infrared wavelengths, then the emitters signal the response over the near-infrared wavelength. In other embodiments, the response to "Identification Friend or Foe" (IFF) interrogation and/or targeting laser acquisition is made with emitters emitting a different wavelength of light than the received wavelength of light. For example, if the "Identification Friend or Foe" (IFF) interrogation and/or targeting laser acquisition is received in the near-infrared wavelengths, the emitters signal the response over the long-infrared wavelength.

Various other exemplary components are shown for completeness including a helmet interface substrate 36 (e.g. mating hook or loop material, or self-adhesive material), battery contacts 42, battery 44, battery enclosure and retention components 30/40/46/48/49/88, and circuit components 90 (e.g., resistors, capacitors, transistors, etc.), etc.

Figure 5:
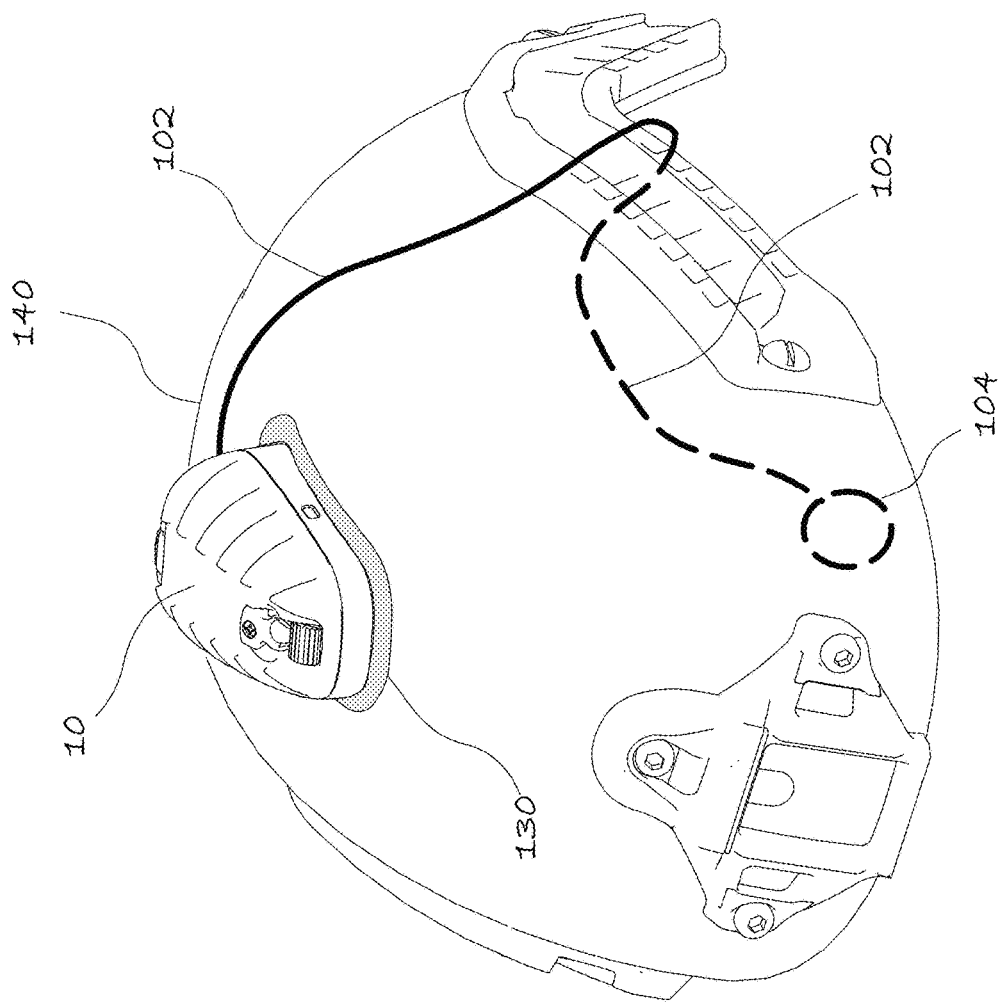
FIG. 5 illustrates a view of the marker system attached to the top of a helmet, showing one potential position of feedback device positioned inside the helmet.

Referring to FIG. 5, a view of the marker system 10 attached to the top of a helmet 140, showing one potential position of vibratory pad 104 positioned inside the helmet 140 is shown. In this example, the marker system 10 is attached to the top of the helmet 140 by, for example, hook and/or loop material 130 interfacing with the helmet interface substrate 36 and the cable 102 is draped over a surface of the helmet 140 and around a rim of the helmet 140, positioning the vibratory pad 104 inside the helmet 140, for example, against the wearer's head such that the wearer will feel the vibration when an interrogation is received.

Figure 6:
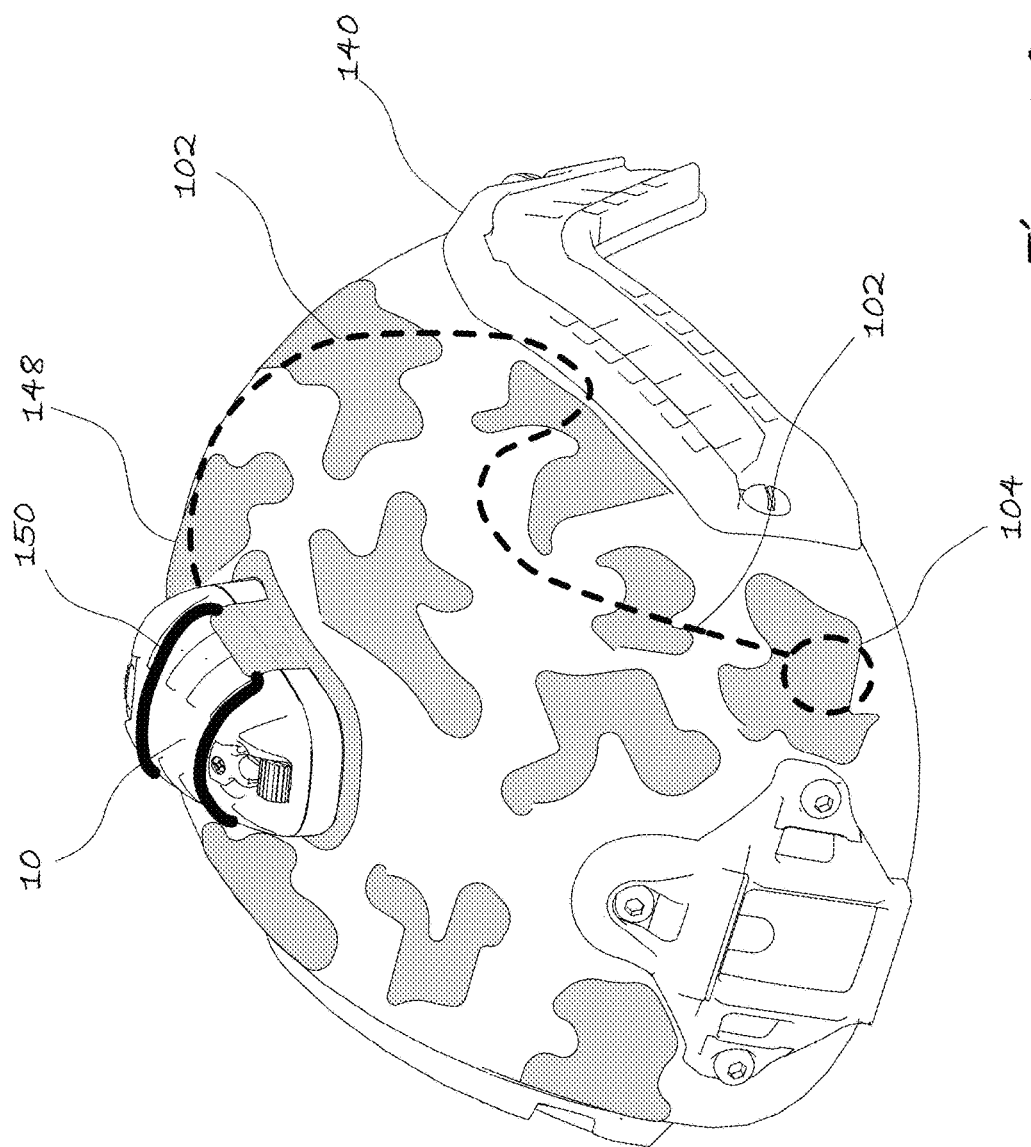
FIG. 6 illustrates a view of the marker system mounted to a fabric cover of a helmet by an intermediate attachment system that is affixed to the fabric cover.

Referring to FIG. 6, the marker system 10 is shown mounted to a fabric cover 148 of a helmet 140 by an intermediate attachment system 150 that is affixed to the fabric cover 148. In this example, the marker system 10 is attached to the top of the helmet 140 by, for example, an intermediate attachment system 150 and the cable 102 is routed between the cloth cover 140 that covers the helmet 140 and a surface of the helmet 140 and then routed around a rim of the helmet 140, positioning the vibratory pad 104 inside the helmet 140, for example, against the wearer's head such that the wearer will feel the vibration when an interrogation is received.

Figure 7:
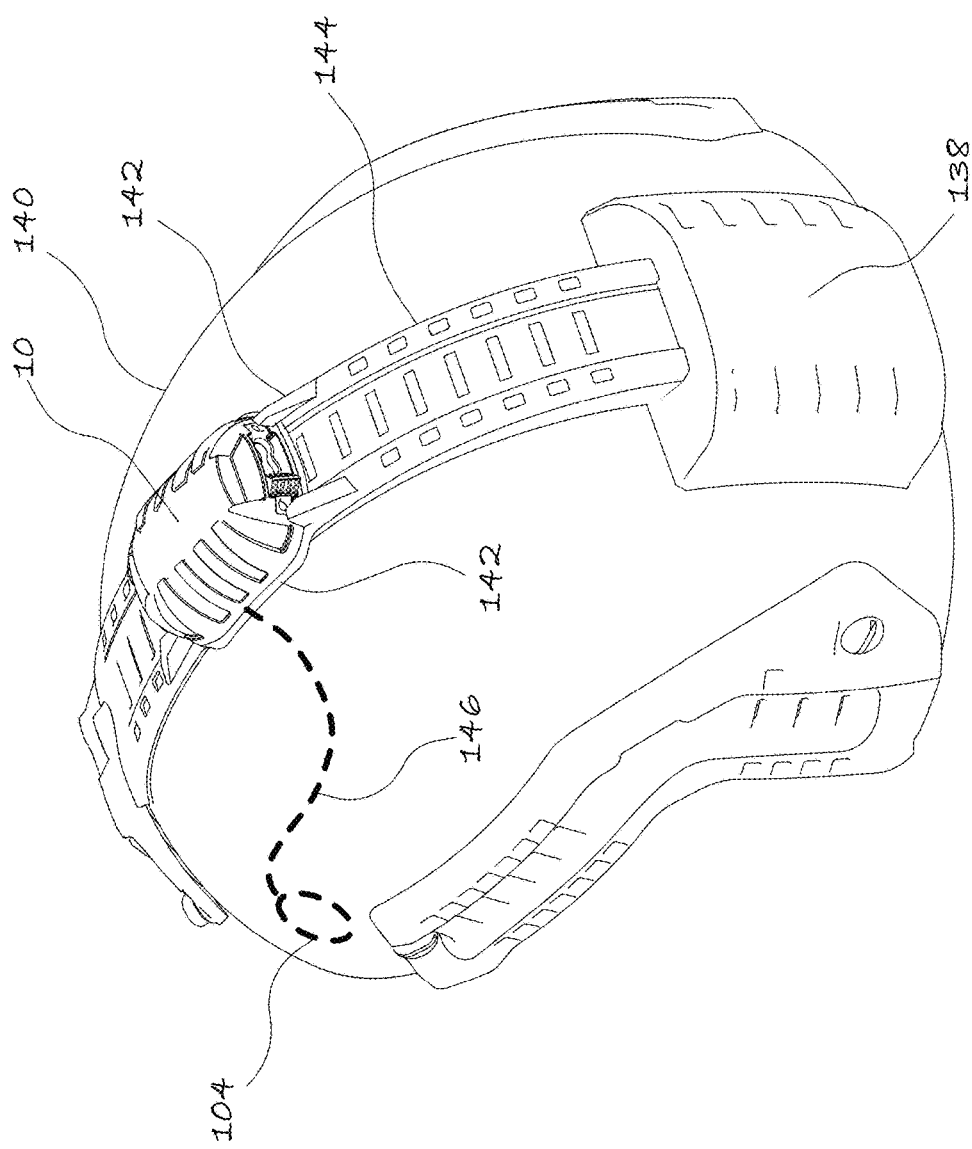
FIG. 7 illustrates a view of the marker system attached to the top of a helmet by way of a helmet-integrated attachment and interconnection system and connected to a helmet-integrated battery source and helmet-integrated feedback device.

Referring to FIG. 7, the marker system 10 is shown attached to the top of a helmet 140 by way of a helmet-integrated attachment and interconnection system 142/144 and connected to a helmet-integrated battery source 138. In this example, the vibratory pad 104 is integrated within the helmet 140 and the marker system 10 connects to the vibratory pad 104 by cable/conductors 146 that are integrated into the helmet 140. In this example, the marker system 10 is attached to the top of the helmet 140 by, for example, a helmet-integrated attachment and interconnection system 142/144. The cable 146 and vibratory pad 104 are integrated into the helmet 140. In such, the cable 146 is routed through an orifice within the helmet 140 and the vibratory pad 104 is provided, mounted inside the helmet 140, for example, against the wearer's head such that the wearer will feel the vibration when an interrogation is received. Power or auxiliary power for the marker system 10 is provided by a helmet mounted power source 138 (e.g. helmet mounted battery).

Figure 8:
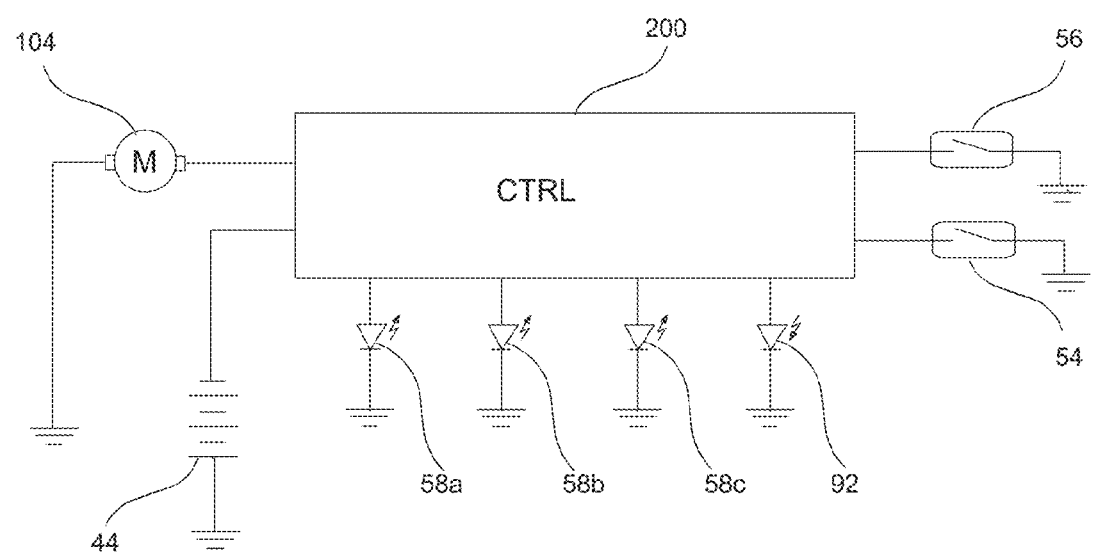
FIG. 8 illustrates a schematic view of a first exemplary marker system circuit.
Figure 8A:
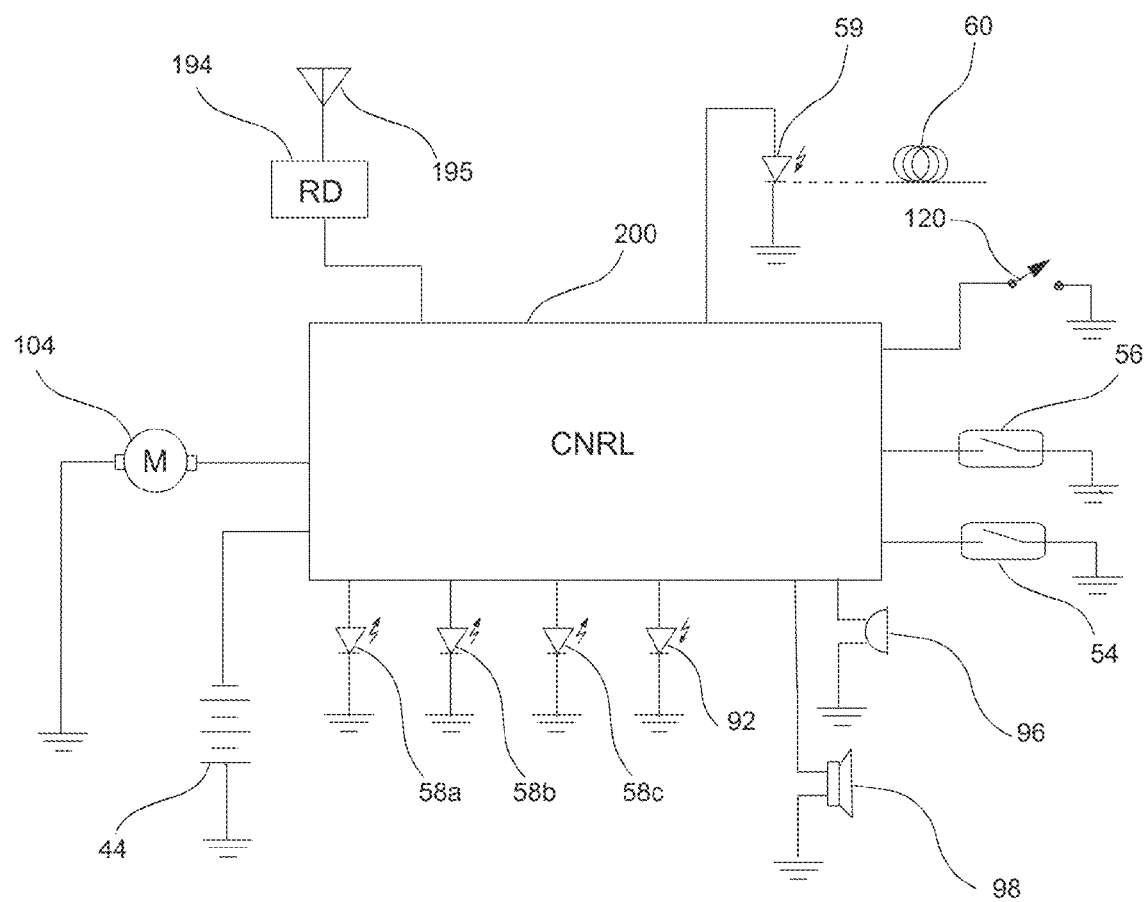
FIG. 8A illustrates a schematic view of a second exemplary marker system circuit.

Referring to FIGS. 8 and 8A, schematic views of an exemplary control circuit 200 of the marker system 10 are shown. In both FIGS. 8 and 8A, the control circuit 200 is, for example, a microcontroller or any known processing element. Any number of switches 54/56 are connected to inputs of the controller 200. The switches 54/56 are shown as reed switches in this example, but there is no limitation as to the type of switches 54/56. One or more detectors 92 are connected to inputs of the controller 200. As light of a wavelength detected by each of the detectors 92 is received, the conductivity and/or impedance of the detector(s) 92 changes and this change is detected at the inputs to the controller 200. Any number of emitters 58a/58b/58c are connected to outputs of the controller 200 such that, upon program control, the controller 200 causes current to flow through one or more of the emitters 58a/58b/58c, causing that/those emitters 58a/58b/58c to emit light at a corresponding wavelength and brightness. Power is provided by a power source 44 (e.g. a battery, super capacitor, etc.). In embodiments having "Identification Friend or Foe" (IFF) interrogation and/or munitions targeting signal acquisition and response capabilities with tactile notification, the vibration generating device 110 (e.g. motor) is connected to an output of the controller 200.

In FIG. 8A, additional optional features are added, including an audio transducer 98 (e.g., a speaker, earphone, or any emitter within the audible range of hearing) and an audio detector 96 (e.g., a microphone). In some embodiments, the audio detector 96 is used to receive voice commands that are recognized and acted upon by the controller 200. Likewise, in some embodiments, audio feedback is provided by the controller 200 through the audio transducer 96.

In some embodiments, a radio 194 with associated antenna 195 is coupled to and controlled by the controller 200. In such embodiments, the radio 194 is, for example, a transceiver for field use and/or for programming. For example, in one embodiment, the radios are Wi-Fi transceivers. Just prior to a parachuting operation, all marker systems 10 are programmed to respond to a specific interrogation code by transmitting program updates from a programming system having a complimentary Wi-Fi transceiver. The program updates are then received by all marker systems 10 by way of the radios 194 (Wi-Fi) within each marker system 10 and internal programming of the controller 200 is updated with the interrogation code. Scenarios such as this provides for enhanced security as it is more difficult for enemy forces to find out what security code is being used and, therefore, more difficult to spoof the code.

Also shown in FIG. 8A is a personnel indicator 59 either positioned at a location that is visible to the wearer (e.g. on a rim of a helmet 140) or optionally coupled to a light pipe 60, where one end of the light pipe receives light from the personnel indicator 59 and a distal end of the light pipe is positioned at a location that is visible to the wearer (e.g. on a rim of a helmet 140), or integrated electronically directly into a helmet-mounted visual heads-up display.

Figure 9:
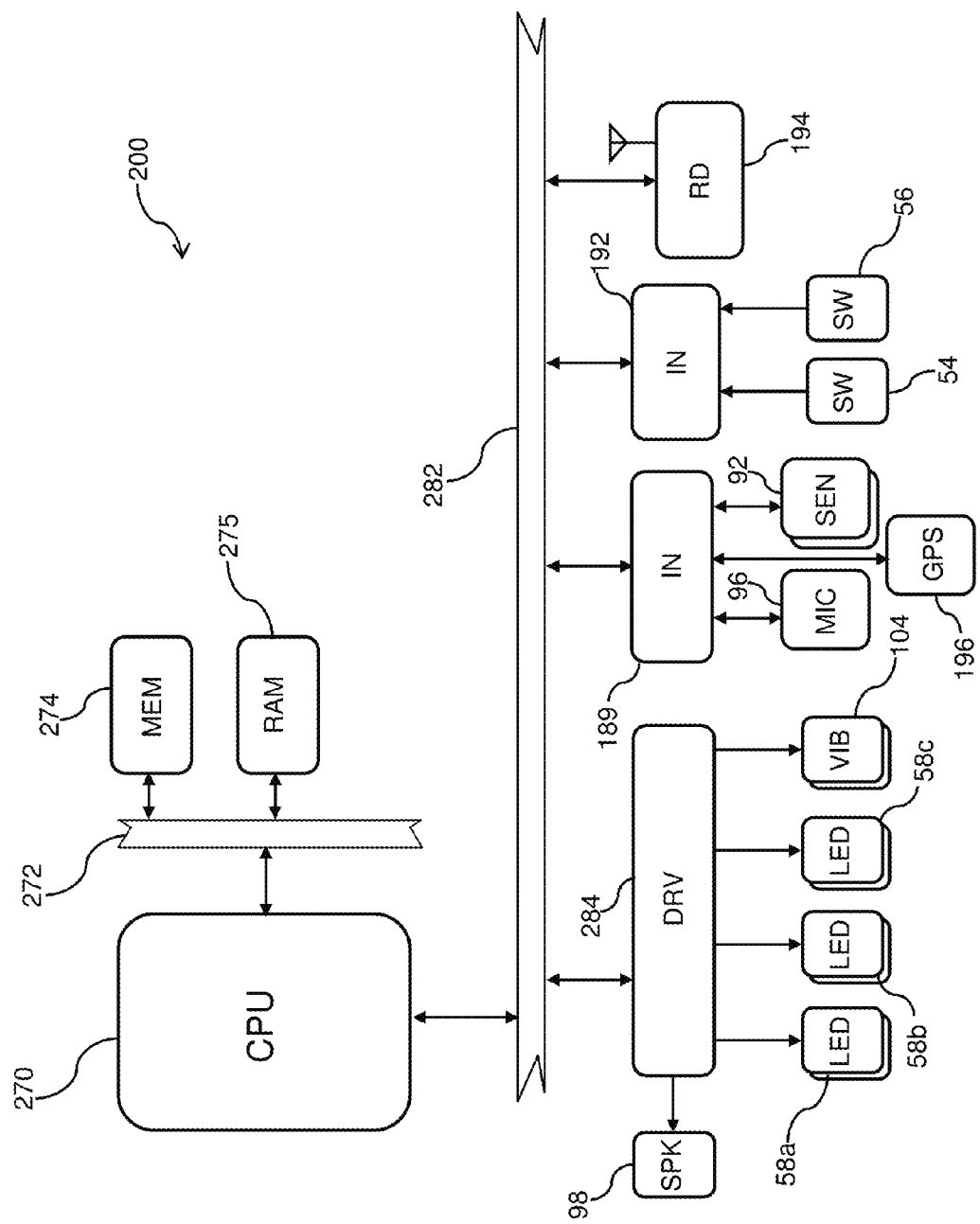
FIG. 9 illustrates a schematic view of an exemplary marker system controller circuit.

Referring to FIG. 9, a schematic view of an exemplary controller 200 as used to control the operation of various output devices of the marker system 10. The exemplary controller 200 represents a typical processor-based system as used with the marker system 10, though it is also known in the industry to utilize logic in place of processors and vice versa. This exemplary controller 200 is shown in its simplest form. Different architectures are known that accomplish similar results in a similar fashion and the marker system 10 is not limited in any way to any particular system architecture or implementation. In this exemplary controller 200, a processor 270 executes or runs programs from a random access memory 275. The programs are generally stored within a persistent memory 274 and loaded into the random access memory 275 when needed. The processor 270 is any processor, typically a processor designed for portable devices. The persistent memory 274, random access memory 275 interfaces through, for example, a memory bus 272. The random access memory 275 is any memory 275 suitable for connection and operation with the selected processor 270, such as SRAM, DRAM, SDRAM, RDRAM, DDR, DDR-2, etc. The persistent memory 274 is any type, configuration, capacity of memory 274 suitable for persistently storing data, for example, flash memory, read only memory, battery-backed memory, magnetic memory, etc. In some exemplary controllers 200, the persistent memory 274 is removable, in the form of a memory card of appropriate format such as SD (secure digital) cards, micro SD cards, compact flash, etc.

Also connected to the processor 270 is a system bus 282 for connecting to peripheral subsystems such as output drivers 284 and inputs 189/192 such as control switches 92. The output drivers 284 receive commands/signals from the processor 270 and control the emitters 58a/58b/58c, the vibration device 104 (when present), and the audio transducer 98 (when present). The input ports 189/192 receive signals from the sensors 92 (when present), the audio detectors 96 (when present), and the switches 54/56, and convey the signals to the processor 270 for action. Although any number of sensors 92 are anticipated, including zero, in some embodiments, there are present at least two different sensors operating at two different wavelengths. For example, a first of the sensors 92 receives interrogations at near infrared and a second of the sensors 92 receives interrogations at short-wave infrared. In another example, a first of the sensors 92 receives interrogations at short-wave infrared and a second of the sensors 92 receives interrogations at mid-wave infrared. In this way, different interrogations are received (and detected) from different sources, concurrently; for example, on one wavelength from ground troops and on another wavelength from aircraft.

In some embodiments, a radio 194 is provided for communications with other systems. Such communication features provide data communications between the marker system 10 and, for example, a programming system (not shown) or an operations base station (not shown) to program the controller 200 and/or activate features of the marker system 10.

The peripherals and sensors shown are examples and other devices are known in the industry such as Global Positioning Subsystems 196, USB interfaces, Bluetooth transceivers, image sensors, body function sensors, temperature sensors, etc., the likes of which are not shown for brevity and clarity reasons.

Figure 10:
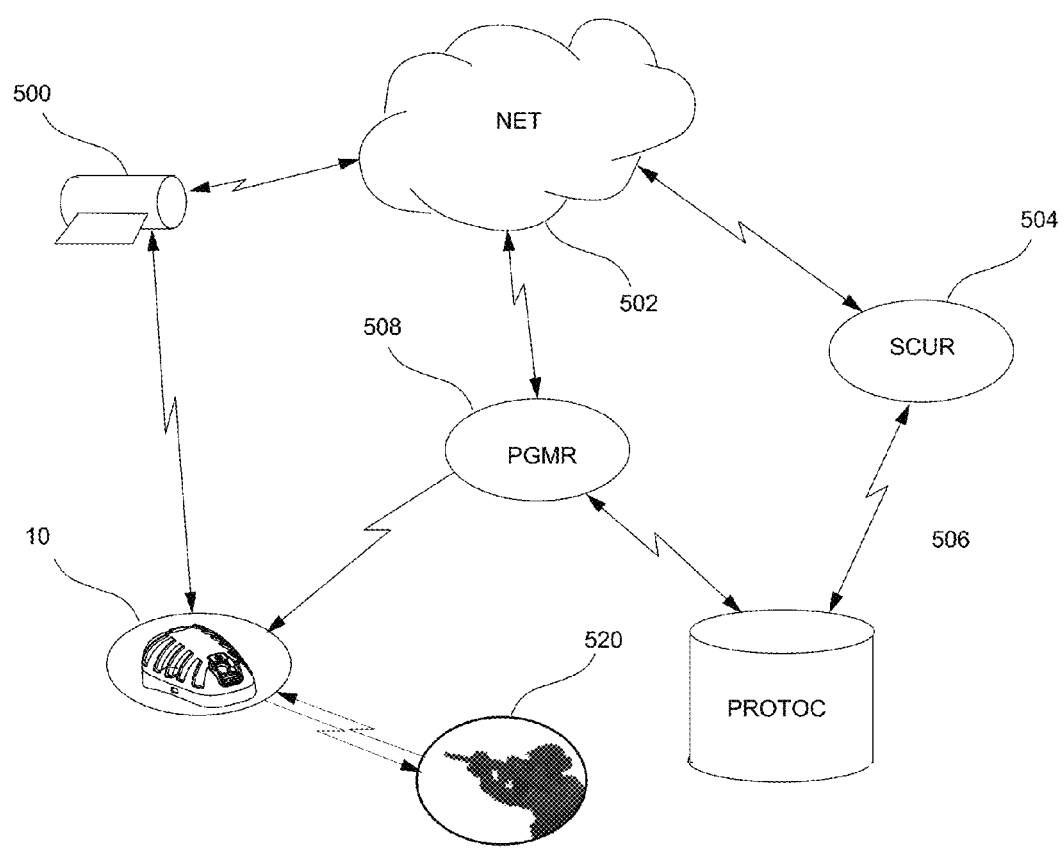
FIG. 10 illustrates a schematic view of an exemplary connection and programming capability for the marker system.

Referring to FIG. 10, a schematic view of an exemplary connection and programming capability for the marker system 10 is shown. In this example, the marker system 10 receives wireless communications in the form of electromagnetic radiation such as visible light, light that is not visible to the naked human eye, radio waves, etc. from either a programming system 508 and/or a handheld or weapon-mounted transmitter 520 and/or from an aircraft- or vehicle-mounted transmitter (not shown for clarity reasons). In embodiments having a radio 194, one form of the electromagnetic radiation is radio waves. In embodiments absent of a radio 194, the electromagnetic radiation is light waves and the light waves are received by the detector(s) 92. In such, the light waves are either light waves that are visible to the naked eye of a human or light waves that are not visible to the naked eye of a human such as infrared light waves. It is anticipated that, in some embodiments, the electromagnetic radiation is modulated and/or encoded with either a programming signal or an incoming IFF interrogation signal. The process for receiving and interpreting the programming signal or/and the incoming IFF interrogation signal is described with FIGS. 11, 12, 13, and 14. Although any number of sensors 92 are anticipated, including zero, in some embodiments, there are present at least two different sensors operating at two different wavelengths of light. For example, a first of the sensors 92 receives interrogations at near infrared wavelengths (NIR) and a second of the sensors 92 receives interrogations at short-wave infrared wavelength (SWIR). In another example, a first of the sensors 92 receives interrogations at long-wave infrared (LIR) wavelengths and a second of the sensors 92 receives interrogations at short-wave infrared (SWIR). In this way, different interrogations are received (and detected) from different sources, concurrently; for example, on one wavelength from ground troops and on another wavelength from aircraft.

In general, programming is initiated by a specific operation of one of the switches 54/56/120. For example, programming is initiated by pressing and holding the operating status confirmation (OSC) switch 120 for a number of seconds, for example five seconds or by coded manipulation/operation of one or more switches 54/56/120. In this way, physical access to the marker system 10 is required to initiate programming, though in some embodiments, it is anticipated that programming is initiated by the programming signal without need to operate any of the switches 54/56/120, though in such it is anticipated that the programming signal is encoded to prevent unauthorized tampering with the program of the marker system 10. The programming signal includes, for example, updated operating software and/or parameter settings. Parameter settings are, for example, the frequency of flashing, the brightness in each mode, flags to enable/disable certain features, etc.

The incoming IFF interrogation signal is transmitted, typically from a handheld or weapon-mounted transmission device 520 or aircraft- or vehicle-mounted transmitters such as a transmitter emitting an infrared laser designed for any number of combat applications including illumination, marking/pointing, IFF interrogation, and munitions-targeting. Note that any form of electromagnetic radiation transmission is anticipated. Infrared laser transmission is used as an example as such transmission is not generally visible to the naked human eye and is typically very directional. When transmitted from a handheld or weapon-mounted transmission device 520, directionality is often desired so as to only signal the user/wearer of the marker system 10 that is targeted. The incoming IFF interrogation signal is received by either the radio 194 or the detectors 92 and processed by the controller 200 to determine validity. It is fully anticipated that the incoming IFF interrogation signal be one or more specific modulations of the electromagnetic radiation having there within embedded a security code such as a cryptographic key. Encoding prevents an enemy having a transmission device 520 from sending an interrogation signal to a friendly combatant for purposes of identifying his/her position for engagement. The controller 200 decodes and processes the signal from the detector(s) 92 and/or the radio 194 to verify the proper modulation and/or encoding of the incoming IFF interrogation signal. When the controller 200 determines a valid incoming IFF interrogation signal, based upon capabilities and settings, the controller responds by illuminating one or more of the emitters 58a/58b/58c, illuminating the personnel indicator 59 (see FIG. 8A), emitting a sound, and/or initiating vibration of the vibratory device 104. Note that, as described above, the programming signal has capabilities to change settings within the marker system 10 and some of those settings are, optionally, how the marker system 10 responds to the incoming IFF interrogation signal (e.g. blinking the infrared emitters 58c three times or blinking the white emitters 58a twice, etc.) and how the marker system 10 indicates reception of an incoming IFF interrogation signal (e.g. pulsing the vibratory device 104, etc.).

In some embodiments, the marker system 10 is configured to receive and detect two or more different signals at different wavelengths or codes, for example, one from handheld or weapon-mounted general purpose infrared illuminators or one from handheld, aircraft- or vehicle-mounted lasers intended for munitions targeting. For example, an aircraft emits a signal at mid-wave infrared that is received by a first of the sensors 92 and is then detected as munitions-targeting signal; and a weapon-mounted transmission device 520 emits a signal at short-wave infrared that is received by a second of the sensors 92 and is then detected as an IFF interrogation signal. Note that it is also anticipated that a single sensor 92 is capable of receiving a range of wavelengths. In some such embodiments, one or multiple different interrogations are received by radiofrequency (e.g. using the radio 194).

In some embodiments, a single response is made to either of the first type of interrogation and the second type of interrogation. In some embodiments, a first type of response is made to the first type of interrogation and a second type of response is made to the second type of interrogation. As a very general example, a first response is blinking the infrared emitters 58c three times and a second response is blinking the white emitters 58a twice, though this is in no way a limitation of the types of responses that are anticipated.

In some embodiments, a single indication of either of the first type of interrogation or the second type of interrogation is made such as emitting a sound, and/or initiating vibration of the vibratory device 104. In some embodiments, a first type of indication is made to the first type of interrogation and a second type of indication is made to the second type of interrogation. As a general example, a first type of indication is three short vibrations of the vibratory device 104 (indicating being tagged by a friendly) while a second type of indication is a long and constant vibration of the vibratory device 104 (indicating being in a zone targeted by an aircraft).

In some embodiments, one or multiple types of responses are made by emitting radio frequency energy by the radio 194. In such, it is known that radio frequency transmitters have limited range, especially one such as a portable radio 194 that has a small, portable antenna and is battery powered. Therefore, the response made using the radio 194 will only be received by other friendly (and foe) forces within a given radius as determined by the power output of the radio 194 and environmental parameters such as foliage, humidity, altitude, etc.

In some embodiments, one or multiple types of responses are made by emitting radio frequency energy by the radio 194, which communicates with another device carried by the wearer of the marker system 10. For example, the radio 194 is a Bluetooth transceiver and, upon detection of one or more types of interrogation, the marker system 10 transmits a Bluetooth packet that is received by the device carried by the wearer of the marker system 10 and the device carried by the wearer of the marker system 10, responsive to receiving the packet, transmits a response using, for example, a higher power radio transmission.

It is fully anticipated that any or all of the input spectra, output spectra, frequency, modulation, duty cycle, date-coding, intensity, mode of output, vibration amplitude, vibration frequency, vibration mode, etc., is programmable through any programming mechanism described, including, but not limited to, programming through light waves received by the sensor(s) 92, programming through the radio 194, programming though operation of one or more switches 54/56, programming through voice recognition using, for example, a microphone 96, etc. For example, in one embodiment, the marker system 10 is configured with two distinct modes of operation. In a first mode, the marker system responds to a first type of indication with a first type of response and responds to a second type of indication with a second type of response. In a second mode, the marker system responds to a third type of indication with a third type of response and responds to a fourth type of indication with a fourth type of response. To change between modes, one operates the switches 54/56 in a specific sequence, for example, holding switch 54 for five seconds to toggle between modes. In some embodiments, light is emitted by one or more of the emitters 58a/58b/58c indicating the resulting mode. In another example, a programming device 508 (see FIG. 10) is used to change modes, etc.

In some embodiments, the modulation scheme and/or encoding is programmable through the programming signal. In this, one or more secure protocols are accessible to the programming system 508 and, for example when a field operation begins; a selected one of the secure protocols (e.g.

modulation scheme and/or encoding) is programmed into each of the marker systems 10 and also into each of the field transmission devices 520, thereby synchronizing the protocols and encoding between all systems to enable communications for the field operation. It is also anticipated that there is an expiration time (or timer) associated with the modulation scheme and/or encoding such that, after the expiration, the modulation scheme is disabled or erased to prevent usage by enemy personnel. As an example, the secure modulation scheme and/or encodings are stored in a storage area 506 that is either accessible to the programmer 508 and/or transmitted to the programmer 508 through a security server 504 and through a network 502, such as a wireless or wired network.

In some embodiments, the marker system 10 includes a global positioning radio receiver 196 for receiving signals from a global positioning satellite 500. When present, the global positioning radio receiver 196 provides location coordinates to the controller 200. On anticipated use of such is to restrict the location of use of the marker system 10 to a specific geographic area and/or modify the operation of the marker system when moving from one geographic area to another geographic area. For example, in high-attitude/high-opening (HIHO) or high-altitude/low-opening (HILO) parachuting operations, the marker system 10 may be configured to emit visible green light for the parachutists for setting up a flying formation during the initial stay of flight while well away from the drop zone and visual security is not required, then when the parachutists are in proximity to the drop zone and visual security is required, the marker system 10 detects the location change from the global positioning radio receiver 196 and reconfigures change from visible green to infrared light, etc.

Referring to FIGS. 11, 12, 13 and 14, flow charts of exemplary software for executing on the controller system 200 of the marker system 10 are shown. As described previously, the controller system reads settings of one or more switches 54/56/120 and, from the settings, the software a function and a mode. The mode switch 66 provides for the selection of one or more operating modes (e.g., mode-A is visible/overt and mode-B is infrared/covert). The function switch 60 provides for the selection of operating functions within each mode of operation (e.g., function-0 is OFF/standby, function-1 is one operating function, and function-2 is a second operating function). The operating status confirmation (OSC) switch 120 is a momentary contact switch that is pressed for a period of time to provide status of the marker system 10, or to initial the field re-programming mode. In combination with the remote and on-board vibratory devices, in some embodiments, pressing the OSC switch further defines the state of the marker system 10 (e.g., pressing the OSC switch only causes the vibratory device 104 located inside the helmet to vibrate signals that the marker system 10 is in the OFF/STAND-BY mode and not emitting, whereas vibration of the on-board vibratory device 108 indicates that both the IFF interrogation/targeting signal features of the market system 10 are ON, and that the device is currently emitting its marker signal.) Again, this is one configuration of switches used as an example, as any number, type, and configuration of switches is anticipated.

In some embodiments, the user selectable operating modes include three selectable modes. A first of such modes is a passive identification mode. In such, the marker system 10 periodically emits a signal (e.g., infrared on one or more wavelengths). If the "Identification Friend or Foe" (IFF) interrogation and/or targeting laser acquisition is received in any wavelength/spectrum of light, either in a single spectrum or alternating between spectrums, the marker system 10 responds with the predetermined response sequence (e.g. reducing the period of the signals that are emitted). A second mode of operation provides a partially secure mode or partial stealth mode in which the marker system 10 does not emit a signal until the "Identification Friend or Foe" (IFF) interrogation and/or targeting laser acquisition is received in the pre-determined wavelength/spectrum of light, in either a single spectrum or alternating between spectrums. The marker system 10 responds with the predetermined response sequence (e.g. emitting a pattern of infrared light on a predetermined spectrum). A Third mode provides secure, total blackout operations or stealth mode in which no responses are emitted (no infrared emission). In the third mode, if the "Identification Friend or Foe" (IFF) interrogation and/or targeting laser acquisition is received in the pre-determined wavelength/spectrum of light, in either a single spectrum or alternating between spectrums, notification to the wearer is made (e.g., through vibrating the external vibratory pad 104 or illuminating the heads-up display 39), but no response is emitted. In this way, the wearer of the marker system 10 will realize that they are being targeted and can take evasive actions.

In the first or second mode, it is anticipated that the marker system 10 is programmable to respond in the same wavelength of light as the wavelength that "Identification Friend or Foe" (IFF) interrogation and/or targeting laser acquisition is received. It is also anticipated that the marker system respond in a different wavelength of light than that the "Identification Friend or Foe" (IFF) interrogation and/or targeting laser acquisition is received. Alternately, the "Identification Friend or Foe" (IFF) interrogation and/or targeting laser acquisition is received in multiple wavelengths and the response is made in one or multiple wavelengths/spectrums, either the same or different wavelengths.

Figure 11:
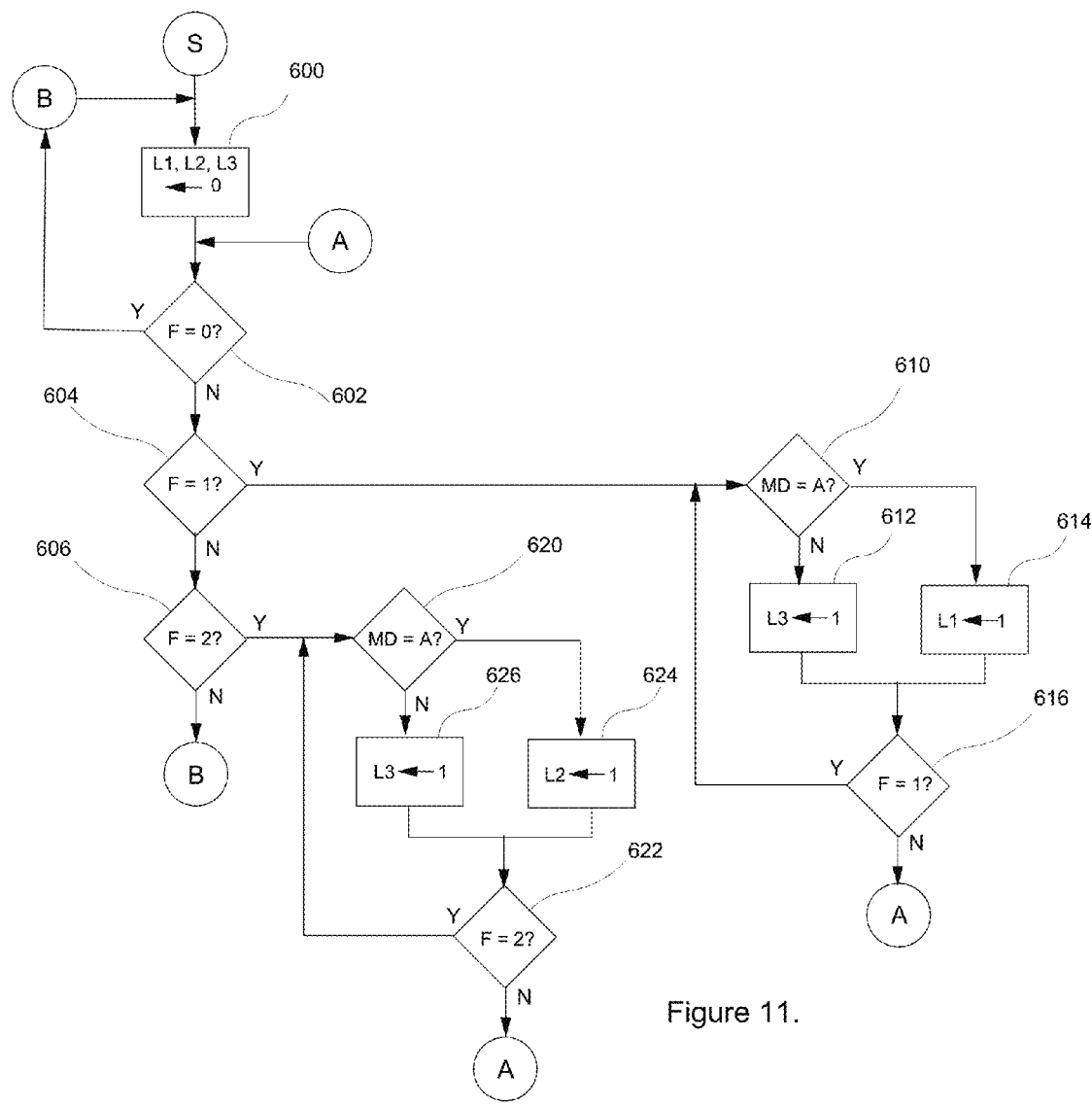
FIG. 11 illustrates a first flow chart of exemplary software for executing on the controller system of the marker system.

In FIG. 11, the first step is to cut off power 600 to all sets of emitters 58a/58b/58c. For simplicity, the first set of emitters 58a are referred to as L1 (e.g. multi-color), the second set of emitters 58b are referred to as L2 (e.g. bright-white), and the third set of emitters 58c are referred to as L3 (e.g. infrared). For example, L1 are a first set of visible color emitters 58a, L2 is a second set of visible color of emitters 58b, and L3 is a third set of non-visible emitters 58b. Note that a set is any number of emitters 58a/58b/58c and visible/invisible is determined by the naked eye of a human. For example, white light is visible to the naked eye of a human while certain or all wavelengths of infrared light is not visible to the naked eye of a human.

Next, a test 602 is performed to determine if the marker system 10 is set to function-0 (OFF/Standby). If the marker system 10 is set to function-0, step 600 is repeated until a change to the switches changes to a different function, at which time it is determined by another test 604 if the marker system 10 is set to function-1. If the marker system 10 is set to function-1 604, then a test 610 is made to determine the mode setting (Mode-A being overt and Mode-B being covert). If the mode is Mode-A 610, then power is provided 614 to the first set of emitters L1, which then emit light, for example, at a certain visible wavelength (to the naked eye of a human). If the mode is Mode-B 610, then power is provided 612 to the third set of emitters L3, which then emit lights, for example, in a certain non-visible wavelength (to the naked eye of a human). A test is made 616 to determine if the marker system 10 is still in function-1 and if so, step 610 is repeated, otherwise, flow resumes at step 602 and the above repeats. Note that in some embodiments, the amount of power (e.g. current) provided to the emitters L1 and/or L3 is determined by a preset or programmed parameter and, in some embodiments, the frequency of the power (e.g., current) provided to the emitters L1 and/or L3 is also determined by a preset or programmed parameter to provide blinking or flashing at a desired rate.

If the marker system 10 is not set to function-1 604, a test 606 is made to determine if the marker system 10 is set to function-2 606. If the marker system 10 is set to function-2 606 then a test 620 is made to determine the mode setting (Mode-A being overt and Mode-B being covert). If the mode is Mode-A 620, then power is provided 624 to the second set of emitters L2, which then emit light, for example, at a certain visible wavelength (to the naked eye of a human). If the mode is Mode-B 620, then power is provided 622 to the third set of emitters L3, which then emit lights, for example, in a certain non-visible wavelength (to the naked eye of a human). A test is made 626 to determine if the marker system 10 is still in function-2 and if so, step 620 is repeated, otherwise, flow resumes at step 602 and the above repeats. Again, note that in some embodiments, the amount of power (e.g. current) provided to the emitters L2 and/or L3 is determined by another preset or programmed parameter and, in some embodiments, the frequency of the power (e.g., current) provided to the emitters L1 and/or L3 is also determined by a preset or programmed parameter to provide blinking or flashing at a desired rate. It is fully anticipated that, based upon such parameters, the brightness, color, and or blinking rate is the same or different in function-2 than in function-1.

Figure 12:
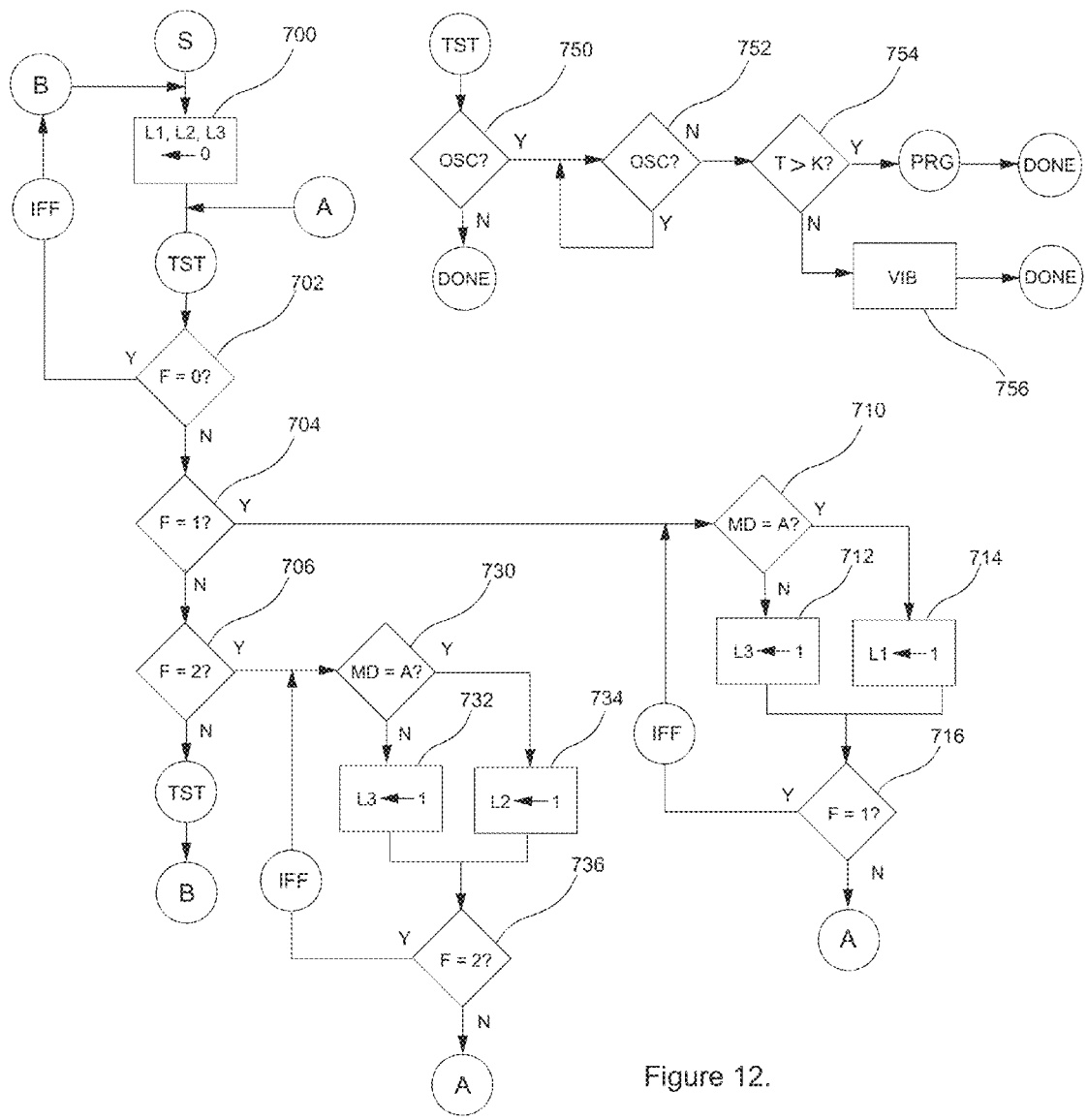
FIG. 12 illustrates a second flow chart of exemplary software for executing on the controller system of the marker system.

A slightly different configuration is shown in FIG. 12, including operation of the operating status confirmation switch 120. In FIG. 12, again, the first step is to cut off power 700 to all sets of emitters 58a/58b/58c.

Next, a TST routine is invoked to determine if the operating status confirmation switch 120 has been pressed, that after returning from that routine, a test 702 is performed to determine if the marker system 10 is set to function-0 (OFF/Standby). If the marker system 10 is set to function-0, step 700 and the TST routine is repeated until a change to the switches changes to a different function, at which time it is determined by another test 704 if the marker system 10 is set to function-1. If the marker system 10 is set to function-1 704, then a test 710 is made to determine the mode setting (Mode-A being overt and Mode-B being covert). If the mode is Mode-A 710, then power is provided 714 to the first set of emitters L1, which then emit light, for example, at a certain visible wavelength (to the naked eye of a human). If the mode is Mode-B 710, then power is provided 712 to the third set of emitters L3, which then emit lights, for example, in a certain non-visible wavelength (to the naked eye of a human). Next, a test is made 716 to determine if the marker system 10 is still in function-1 and if so, an IFF routine is executed then flow resumes at step 710. Otherwise, flow resumes at step 702 and the above repeats. Note that in some embodiments, the amount of power (e.g. current) provided to the emitters L1 and/or L3 is determined by a preset or programmed parameter and, in some embodiments, the frequency of the power (e.g., current) provided to the emitters L1 and/or L3 is also determined by a preset or programmed parameter to provide blinking or flashing at a desired rate.

If the marker system 10 is not set to function-1 704, a test 706 is made to determine if the marker system 10 is set to function-2 706. If the marker system 10 is set to function-2 706 then a test 730 is made to determine the mode setting (Mode-A being overt and Mode-B being covert). If the mode is Mode-A 730, then power is provided 734 to the second set of emitters L2, which then emit light, for example, at a certain visible wavelength (to the naked eye of a human). If the mode is Mode-B 720, then power is provided 732 to the third set of emitters L3, which then emit light, for example, in a certain non-visible wavelength (to the naked eye of a human). Next, a test is made 736 to determine if the marker system 10 is still in function-2 and if so, the IFF routine is executed, then flow resumes with step 730. Otherwise, flow resumes at step 702 and the above repeats. Again, note that in some embodiments, the amount of power (e.g. current) provided to the emitters L2 and/or L3 is determined by another preset or programmed parameter and, in some embodiments, the frequency of the power (e.g., current) provided to the emitters L2 and/or L3 is also determined by a preset or programmed parameter to provide blinking or flashing at a desired rate. It is fully anticipated that, based upon such parameters, the brightness, color, and or flashing rate is the same or different in function-2 than in function-1.

The TST routine polls the position of the operating status confirmation switch 120 which, as discussed, is preferably a momentary contact switch. If the operating status confirmation switch 120 is not closed 750, the TST routine is done and returns. If the operating status confirmation switch 120 is closed 750, a timing loop 752 begins, looping until it is detected that the operating status confirmation switch 120 has opened. Note that for brevity, the typical switch de-bounce logic is not shown. The operation of the operating status confirmation switch 120 includes a short hold when the user desires status and a longer hold when the marker system 10 is to be programmed. Once it is detected that the operating status confirmation switch 120 has opened, if the time held is determined to be greater than a threshold (e.g., greater than five seconds), a programming subroutine is initiated (see FIG. 14). Otherwise, indication is performed 756 optionally including vibrating the external vibratory pad 104, vibrating the internal vibrator 108, and/or illuminating one or more status indicator emitter(s) 59 (see FIG. 8A) that are, for example, made visible to the wearer through a fiber optic channel 60 that directs light from the emitters 59, for example, to an edge of the user's helmet. In such, the status indicator emitter(s) 59 radiate visible light so as to be visible by the user.

Figure 13:
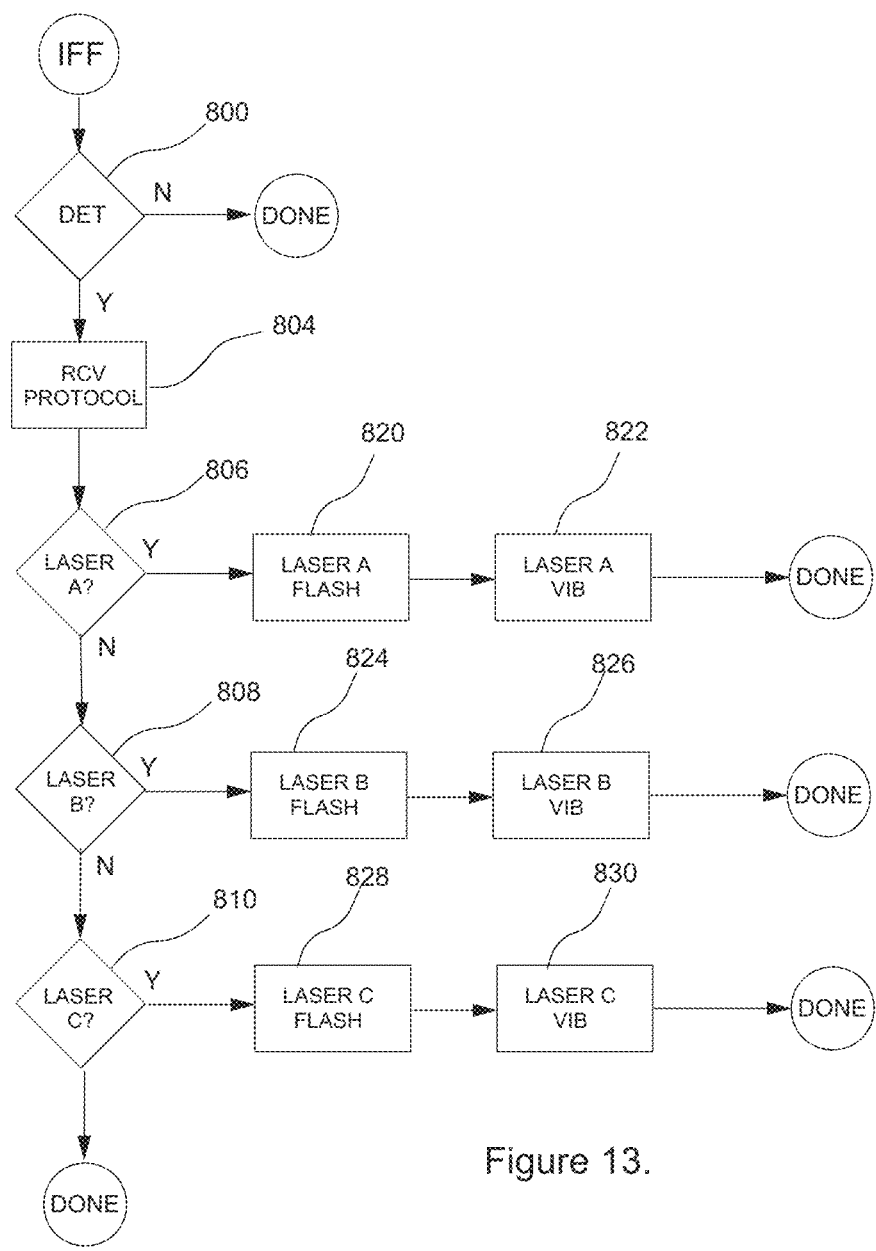
FIG. 13 illustrates a third flow chart of exemplary software for executing on the controller system of the marker system.

In FIG. 13, in systems that support incoming IFF interrogation/targeting signals, testing and processing regarding any incoming signal is made. First, a test 800 is made to determine if an IFF interrogation/targeting signal is incoming. If no incoming IFF interrogation/targeting signal is detected, the IFF routine exits (e.g., no radio transmission is detected or no signal is detected at the detectors 92). If a signal is present, possibly being the start of an incoming IFF interrogation/targeting signal, the IFF routine receives the incoming IFF interrogation/targeting signal 804. In general, there are many known ways to modulate and/or encode the IFF interrogation/targeting signals, all of which are included here within. The marker system 10 has the ability to detect and decode any number of different IFF interrogation/targeting signals and, for each different IFF interrogation/targeting signal, the maker system 10 is capable of responding either the same way for all IFF interrogation/targeting signals, or differently, depending upon configuration parameters. In the example shown in FIG. 13, three different incoming IFF interrogation/targeting signals are recognized, with up to three different actions based upon configuration parameters.

First, a test 806 is made to determine if the incoming IFF interrogation/targeting signal is a first type, and, if so, a specific response is made 820 and a specific notification is made 822. An example of a response made 820 is a specific pattern of flashing of the indicators 58c that are not visible to the naked eye. An example of a notification 822 is a specific sequence of vibrations at, for example, the vibratory pad 104 and/or illumination of the status indicator 59. The notifications 822 provide the wearer with an indication that the wearer is being illuminated by an IFF interrogation or munitions targeting signal. After the response 820 and notification 822, the IFF routine exits.

If the incoming IFF interrogation/targeting signal is not the first type, a test 808 is made to determine if the incoming IFF interrogation/targeting signal is a second type, and, if so, a specific response is made 824 and a specific notification is made 826. An example of a response made 824 is a specific pattern of flashing of the indicators 58c that are not visible to the naked eye. An example of a notification 826 is a specific sequence of vibrations at, for example, the vibratory pad 104 and/or illumination of the status indicator 59. The notifications provide the wearer with an indication that the wearer is being illuminated by an IFF interrogation/targeting signal. After the response 824 and notification 826, the IFF routine exits.

If the incoming IFF interrogation/signal is not the second type, a test 810 is made to determine if the incoming IFF interrogation/targeting signal is a third type, and, if so, a specific response is made 828 and a specific notification is made 830. An example of a response made 828 is a specific pattern of flashing of the indicators 58c that are not visible to the naked eye. An example of a notification 830 is a specific sequence of vibrations at, for example, the vibratory pad 104 and/or illumination of the status indicator 59. The notifications 830 provide the wearer with an indication that the wearer is being interrogated. After the response 828 and notification 830, the IFF routine exits.

Note that it is fully anticipated that configuration parameters and specific programming of the marker system 10 provide for factory and/or field programming of the IFF interrogation/targeting signal protocols, security codes, parameters, etc., such that, in some embodiments, the IFF interrogation/targeting signals recognized by the marker system 10 are established during manufacture and/or during field operations. Further, it is fully anticipated that configuration parameters regarding specific response signaling and/or notification signals are also factory and/or field programmed as needed. It is also anticipated that, in some embodiments, there are no IFF interrogation/targeting signal capabilities and/or the IFF interrogation/targeting signal are disabled.

Figure 14:
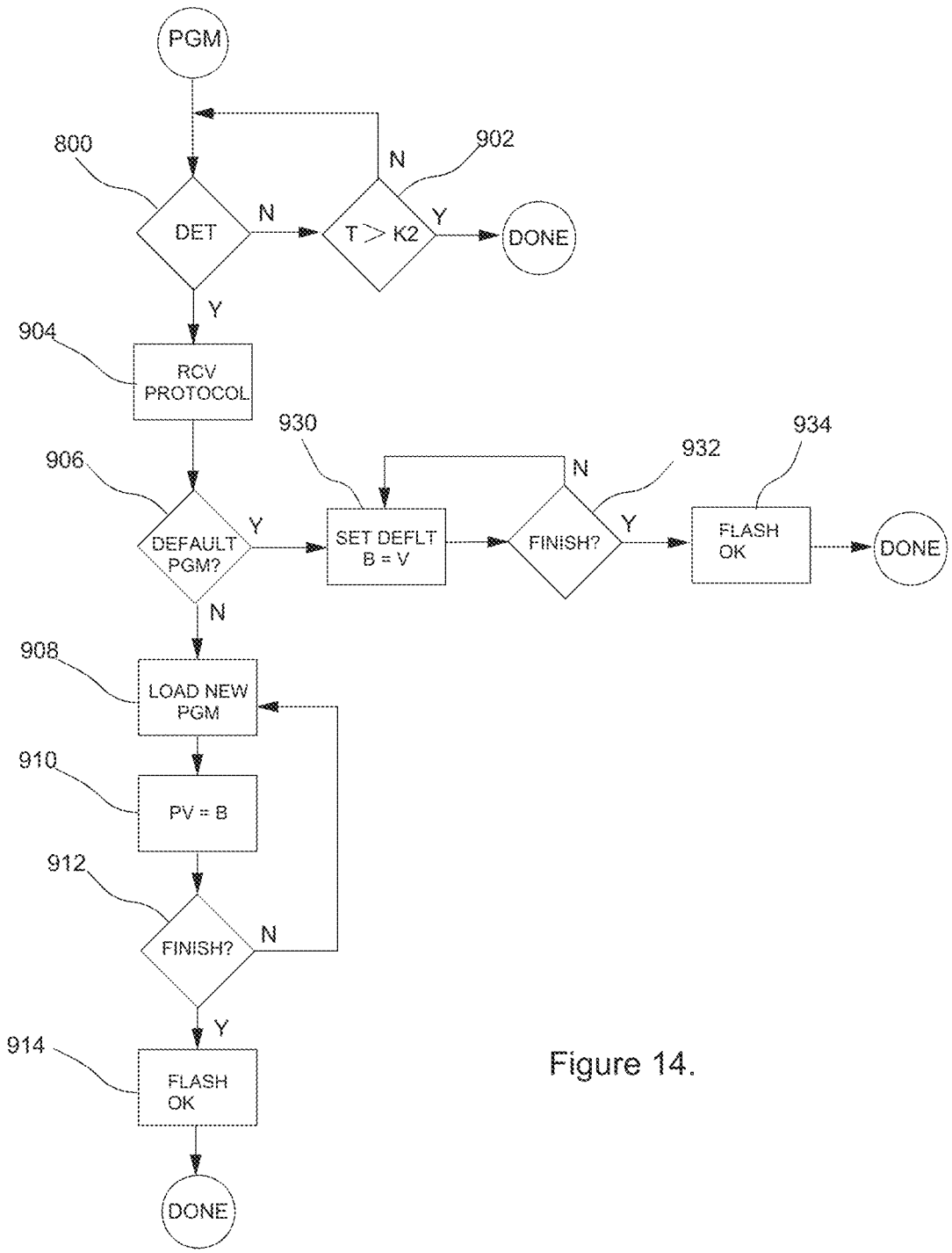
FIG. 14 illustrates a fourth flow chart of exemplary software for executing on the controller system of the marker system.

FIG. 14 shows one example of software for wired or wireless programming or re-programming the marker system 10. The marker system 10 is programmed or re-programmed in the factory or in the field. This software is run when the operating status confirmation switch 120 is held for a specific period of time, for example, for five seconds. (In another embodiment, sequencing of the other switches could initiate the programming sequence). The programming starts with a loop that detects if a programming signal is being received 900 and, if not, checks to see it a certain amount of time has elapsed 902 (e.g., 20 seconds). If the time has elapsed 920, the programming routine finishes and will need to be repeated again later if programming is desired.

Once the programming signal start is detected 900, the programming is received 904 then it is determined 906 if the programming that was received is a new program or a set of new parameters. If the programming is a set of new parameters, each parameter is set 930 until a test is made determining that there are no more new parameters 932, at which time the parameters are set into flash memory 934 and the programming ends. If the programming is a new program (e.g. an update to the operating program of the marker system 10), the new program is loaded 908 and copied into flash memory a block at a time 910 until a test is made determining that there are no more blocks to be copied 912, at which time the flashing ends 914 and the programming ends.

In some embodiments, it is anticipated that the programming includes setting the encoding algorithms for the Identification Friend or Foe (IFF) and for the munitions-targeting signal. In such, it is also anticipated that the programming includes setting the wavelength(s) for the Identification Friend or Foe (IFF) and for the munitions-targeting signal; setting the wavelength(s) for the responses, setting the patterns for the notification signals, configuring the operation of any switches that are present, etc.

The above shows on exemplary set of programs operating on the controller 200 and is intended as an example, as many other programs are fully anticipated and the examples shown are in no way meant to limit the marker system 10 in any way.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A marker system, comprising:
   at least one emitter, each of the at least one emitter emits light responsive to a flow of electrical current through the emitter;
   means for acquiring incoming signals, the means for acquiring incoming signals detecting light in one or more wavelengths of light, the means for acquiring incoming signals comprises two or more photo detectors mounted and aimed in at least two different directions within the marker system to provide directional data, each the photo detectors responsive to at least one wavelength of light selected from visible light, near infrared light, short-wave infrared, mid-wave infrared, and long-wave infrared;
   means for processing the incoming signals, the means for processing the incoming signals monitors the means for acquiring the incoming signals and determines if the incoming signals includes any of a plurality of incoming Identification Friend or Foe (IFF) and munitions-targeting signals;
   means for notifying;
   upon detecting an incoming Identification Friend or Foe (IFF), the means for processing notifies regarding the Identification Friend or Foe (IFF); and
   upon detecting an incoming munitions-targeting signal, the means for processing notifies regarding the munitions-targeting signals;
   wherein the direction is encoded as a vibration pattern emitted from the means for notifying.

2. The marker system of claim 1, wherein upon detecting the incoming Identification Friend or Foe (IFF) signal, the means for processing emits a first response by flowing electrical current through any or all of the at least one emitter when not in a stealth mode, the emitters emit light in a first spectrum of light.

3. The marker system of claim 2, wherein the first wavelength of light is the same wavelength as a wavelength of the incoming Identification Friend or Foe (IFF) signal.

4. The marker system of claim 2, wherein upon detecting an incoming munitions-targeting signal, the means for processing emits a second response by flowing electrical current through any or all of the at least one emitter, the emitters emit light in a second spectrum of light.

5. The marker system of claim 4, wherein the second wavelength of light is the same wavelength as a wavelength of the incoming munitions-targeting signal.

6. A marker system, comprising:
a controller for receiving incoming signals;
a switch electrically interfaced to the controller;
a plurality of light emitting diodes, each light emitting diodes of the plurality of light emitting diodes electrically interfaced to the controller;
at least two photo detectors electrically interfaced to the controller, the at least two photo detectors positioned within the marker system;
a vibration device electrically interfaced to the controller;
software stored on a non-transitory storage associated with the controller, in at least position of the switch, the controller provides electrical current to one or more of the light emitting diodes such that the one or more of the light emitting diodes emit light, either steady or blinking based upon the position of the switch, the software processing an electrical signal from the at least two photo detectors, the software detects if the incoming signals includes any of an incoming Identification Friend or Foe (IFF) and a munitions-targeting signal;
upon the software detecting the incoming Identification Friend or Foe (IFF) signal, if the switch is set to a non-stealth mode, the software provides electrical current in a first pattern to a first subset of the light emitting diodes to respond to the incoming Identification Friend or Foe (IFF); and
upon the software detecting the incoming munitions-targeting signal, if the switch is in a non-stealth mode, the software provides electrical current in a second pattern to a second subset of the light emitting diodes to respond to the incoming munitions-targeting signal.

7. The marker system of claim 6, wherein the at least two photo detectors are aimed in different directions to provide directional data and upon the software detecting the incoming Identification Friend or Foe (IFF) signal, the software provides electrical current to the vibration device in a first vibration pattern, thereby causing the vibration device to vibrate indicating that the incoming Identification Friend or Foe (IFF) was detected, the first pattern indicating the direction from which the incoming Identification Friend or Foe (IFF) signal came based upon the directional data and whereas upon the software detecting the incoming munitions-targeting signal, the software provides electrical current to the vibration device in a second vibration pattern, thereby causing the vibration device to vibrate indicating that the incoming munitions-targeting signal was detected, the second pattern indicating the direction from which the incoming Identification Friend or Foe (IFF) signal came based upon the directional data.

8. The marker system of claim 7, wherein upon the software detecting the incoming munitions-targeting signal, the software provides electrical current to the vibration device in a second vibration pattern, thereby causing the vibration device to vibrate indicating that the incoming munitions-targeting signal was detected, the second pattern indicating the direction from which the incoming munitions-targeting signal came based upon the directional data.

9. The marker system of claim 8, wherein the first subset of the light emitting diodes emit light in a same wavelength at a wavelength of the incoming Identification Friend or Foe (IFF) signal that was received.

10. The marker system of claim 8, wherein upon flow of current through the emitters, the emitters emit light at least one wavelength of light selected from visible light, near infrared light, short-wave infrared, mid-wave infrared, and long-wave infrared.

11. The marker system of claim 6, wherein the photo detectors responsive to at least one wavelength of light selected from visible light, near infrared light, short-wave infrared, mid-wave infrared, and long-wave infrared.

* * * * *